(12) United States Patent
Kim et al.

(10) Patent No.: US 9,048,895 B2
(45) Date of Patent: Jun. 2, 2015

(54) MULTI-USER NULL DATA PACKET (MU-NDP) SOUNDING WITHIN MULTIPLE USER, MULTIPLE ACCESS, AND/OR MIMO WIRELESS

(75) Inventors: Joonsuk Kim, Saratoga, CA (US); Matthew James Fischer, Mountain View, CA (US); Peiman Amini, Mountain View, CA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 1176 days.

(21) Appl. No.: 12/950,139

(22) Filed: Nov. 19, 2010

(65) Prior Publication Data
US 2011/0075607 A1 Mar. 31, 2011

Related U.S. Application Data

(63) Continuation-in-part of application No. 12/796,655, filed on Jun. 8, 2010, and a continuation-in-part of application No. 12/794,707, filed on Jun. 4, 2010, which is a continuation-in-part of application No.
(Continued)

(51) Int. Cl.
| | |
|---|---|
| *H04W 4/00* | (2009.01) |
| *H04B 7/04* | (2006.01) |
| *H04L 1/06* | (2006.01) |
| *H04L 25/02* | (2006.01) |
| *H04B 7/06* | (2006.01) |
| *H04L 1/00* | (2006.01) |
| *H04L 5/00* | (2006.01) |

(52) U.S. Cl.
CPC .......... *H04B 7/0452* (2013.01); *H04B 7/0417* (2013.01); *H04B 7/0643* (2013.01); *H04L 1/0065* (2013.01); *H04L 1/0068* (2013.01); *H04L 1/0631* (2013.01); *H04L 5/0023* (2013.01); *H04L 25/0204* (2013.01); *H04L 25/0226* (2013.01)

(58) Field of Classification Search
None
See application file for complete search history.

(56) References Cited

U.S. PATENT DOCUMENTS

| 7,804,800 | B2 * | 9/2010 | Li et al. ........................... 370/334 |
| 2008/0192707 | A1 * | 8/2008 | Xhafa et al. ..................... 370/336 |
| 2010/0248635 | A1 * | 9/2010 | Zhang et al. .................. 455/63.1 |
| 2010/0260138 | A1 * | 10/2010 | Liu et al. ........................ 370/330 |

(Continued)

*Primary Examiner* — Kibrom T Hailu
(74) *Attorney, Agent, or Firm* — Garlick & Markison; Shayne X. Short

(57) ABSTRACT

Multi-user null data packet (MU-NDP) sounding within multiple user, multiple access, and/or MIMO wireless communications. Within communication systems including multiple wireless communication devices (e.g., one or more APs, STAs, etc.), channel sounding of the selected communication links between the various wireless communication devices is performed. A MU-NDP announcement frame is transmitted to and received by various wireless communication devices indicating which of those wireless communication devices (e.g., one, some, or all) are being sounded. Then, respective NDP sounding frames are transmitted via the communication links corresponding to those wireless communication devices (e.g., one, some, or all) are being sounded, and sounding feedback signals are subsequently sent back to the original transmitting wireless communication device. In some instances, after transmission of the MU-NDP announcement frame, a clear to send (CTS) is sent from at least one of the wireless communication devices thereby precipitating the transmission of the NDP sounding frames.

31 Claims, 22 Drawing Sheets

Related U.S. Application Data

12/794,711, filed on Jun. 4, 2010, now Pat. No. 8,498,359.

(60) Provisional application No. 61/321,430, filed on Apr. 6, 2010, provisional application No. 61/185,153, filed on Jun. 8, 2009, provisional application No. 61/185,161, filed on Jun. 8, 2009, provisional application No. 61/186,119, filed on Jun. 11, 2009, provisional application No. 61/311,480, filed on Mar. 8, 2010, provisional application No. 61/250,491, filed on Oct. 9, 2009, provisional application No. 61/255,690, filed on Oct. 28, 2009, provisional application No. 61/257,323, filed on Nov. 2, 2009, provisional application No. 61/321,430, filed on Apr. 6, 2010, provisional application No. 61/232,316, filed on Aug. 7, 2009, provisional application No. 61/240,285, filed on Sep. 7, 2009, provisional application No. 61/250,531, filed on Oct. 11, 2009, provisional application No. 61/255,232, filed on Oct. 27, 2009, provisional application No. 61/319,366, filed on Mar. 31, 2010, provisional application No. 61/184,420, filed on Jun. 5, 2009, provisional application No. 61/185,153, filed on Jun. 8, 2009, provisional application No. 61/184,420, filed on Jun. 5, 2009, provisional application No. 61/185,153, filed on Jun. 8, 2009.

(56) References Cited

U.S. PATENT DOCUMENTS

| | | | |
|---|---|---|---|
| 2011/0080977 A1* | 4/2011 | Liu et al. | 375/316 |
| 2011/0128929 A1* | 6/2011 | Liu et al. | 370/329 |
| 2011/0149882 A1* | 6/2011 | Gong et al. | 370/329 |

* cited by examiner

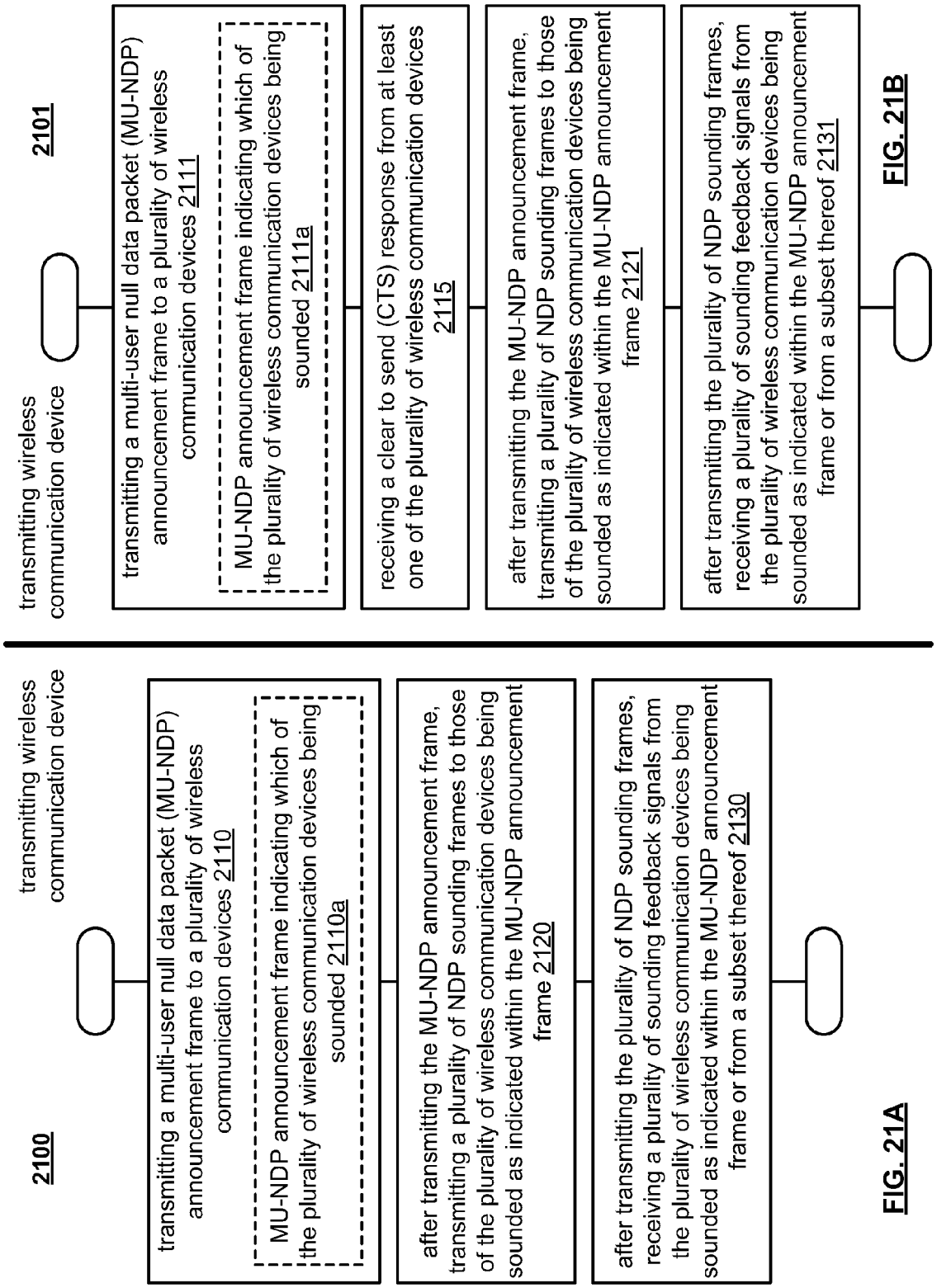

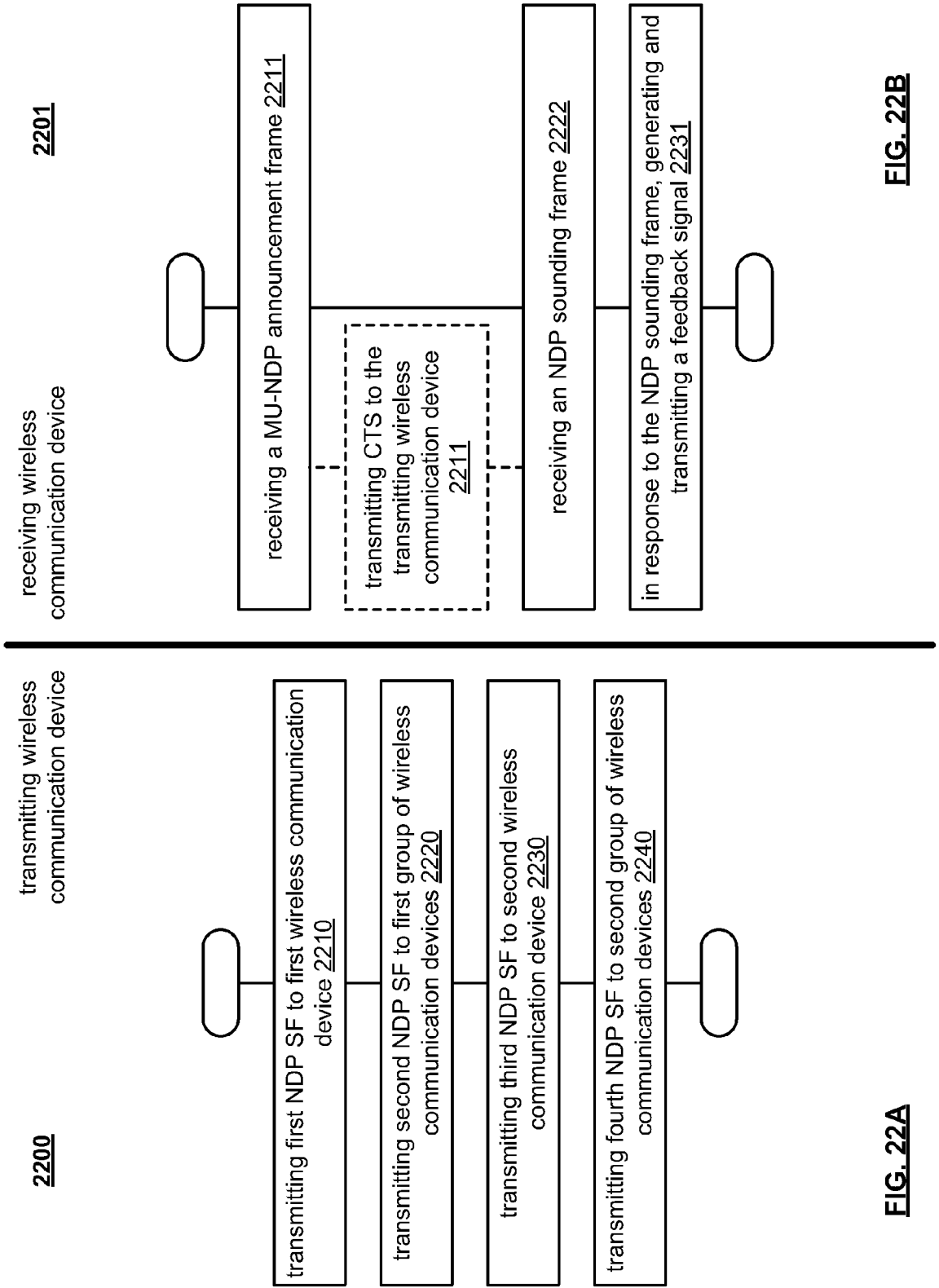

MULTI-USER NULL DATA PACKET (MU-NDP) SOUNDING WITHIN MULTIPLE USER, MULTIPLE ACCESS, AND/OR MIMO WIRELESS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/321, 430, entitled "Multi-user multiple input multiple output preamble," filed Apr. 6, 2010, pending.

Continuation-in-part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 12/796,655, entitled "Group identification and definition within multiple user, multiple access, and/or MIMO wireless communications," filed on Jun. 8, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:

1.1. U.S. Provisional Patent Application Ser. No. 61/185, 153, entitled "OFDMA cluster parsing and acknowledgement to OFDMA/MU-MIMO transmissions in WLAN device," filed Jun. 8, 2009, now expired.

1.2. U.S. Provisional Patent Application Ser. No. 61/185, 161, entitled "WLAN Multi-user/OFDM multiple access training," filed Jun. 8, 2009, now expired.

1.3. U.S. Provisional Patent Application Ser. No. 61/186, 119, entitled "WLAN Multi-user/OFDM multiple access training," filed Jun. 11, 2009, now expired.

1.4. U.S. Provisional Patent Application Ser. No. 61/311, 480, entitled "Next generation WLAN backwards compatible sounding frame," filed Mar. 8, 2010, pending.

1.5. U.S. Provisional Patent Application Ser. No. 61/250, 491, entitled "Multi-user multiple input multiple output preamble," filed Oct. 9, 2009, now expired.

1.6. U.S. Provisional Patent Application Ser. No. 61/255, 690, entitled "Multi-user multiple input multiple output preamble," filed Oct. 28, 2009, now expired.

1.7. U.S. Provisional Patent Application Ser. No. 61/257, 323, entitled "Multi-user multiple input multiple output preamble," filed Nov. 2, 2009, now expired.

1.8. U.S. Provisional Patent Application Ser. No. 61/321, 430, entitled "Multi-user multiple input multiple output preamble," filed Apr. 6, 2010, pending.

1.9. U.S. Provisional Patent Application Ser. No. 61/232, 316, entitled "WLAN next generation PHY header options," filed Aug. 7, 2009, now expired.

1.10. U.S. Provisional Patent Application Ser. No. 61/240, 285, entitled "WLAN next generation PHY header options," filed Sep. 7, 2009, now expired.

1.11. U.S. Provisional Patent Application Ser. No. 61/250, 531, entitled "WLAN next generation PHY header options," filed Oct. 11, 2009, now expired.

1.12. U.S. Provisional Patent Application Ser. No. 61/255, 232, entitled "WLAN next generation PHY header options," filed Oct. 27, 2009, now expired.

1.13. U.S. Provisional Patent Application Ser. No. 61/319, 366, entitled "Efficient group ID for MU-MIMO transmissions in next generation WLAN," filed Mar. 31, 2010, pending.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:

2.1. U.S. Provisional Patent Application Ser. No. 61/184, 420, entitled "OFDMA cluster parsing and acknowledgement to OFDMA/MU-MIMO transmissions in WLAN device," filed Jun. 5, 2009, now expired.

2.2. U.S. Provisional Patent Application Ser. No. 61/185, 153, entitled "OFDMA cluster parsing and acknowledgement to OFDMA/MU-MIMO transmissions in WLAN device," filed Jun. 8, 2009, now expired.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

3. U.S. Utility patent application Ser. No. 12/794,711, entitled "Transmission acknowledgement within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:

3.1. U.S. Provisional Patent Application Ser. No. 61/184, 420, entitled "OFDMA cluster parsing and acknowledgement to OFDMA/MU-MIMO transmissions in WLAN device," filed Jun. 5, 2009, now expired.

3.2. U.S. Provisional Patent Application Ser. No. 61/185, 153, entitled "OFDMA cluster parsing and acknowledgement to OFDMA/MU-MIMO transmissions in WLAN device," filed Jun. 8, 2009, now expired.

Incorporation by Reference

The following U.S. Utility Patent Applications are hereby incorporated herein by reference in their entirety and are made part of the present U.S. Utility Patent Application for all purposes:

1. U.S. Utility patent application Ser. No. 12/796,654, entitled "Channel characterization and training within multiple user, multiple access, and/or MIMO wireless communications," filed on Jun. 8, 2010, pending.

2. U.S. Utility patent application Ser. No. 12/817,118, entitled "Scheduled clear to send (CTS) for multiple user, multiple access, and/or MIMO wireless communications," filed on Jun. 16, 2010, pending.

3. U.S. Utility patent application Ser. No. 12/821,094, entitled "Medium accessing mechanisms within multiple user, multiple access, and/or MIMO wireless communications," filed on Jun. 22, 2010, pending.

4. U.S. Utility patent application Ser. No. 12/852,435, entitled "Management frame map directed operational parameters within multiple user, multiple access, and/or MIMO wireless communications," filed on Aug. 6, 2010, pending.

5. U.S. Utility patent application Ser. No. 12/949,921, entitled "Group identification and definition employing look up table (LUT) within multiple user, multiple access, and/or MIMO wireless communications,", filed concurrently on Nov. 19, 2010, pending.

Incorporation by Reference

The following IEEE standards are hereby incorporated herein by reference in their entirety and are made part of the present U.S. Utility Patent Application for all purposes:

1. IEEE Std 802.11™-2007, "IEEE Standard for Information technology—Telecommunications and information exchange between systems-Local and metropolitan area networks-Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™-2009, "IEEE Standard for Information technology-Telecommunications and information exchange between systems-Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 pages.

BACKGROUND OF THE INVENTION

1. Technical Field of the Invention

The invention relates generally to communication systems; and, more particularly, it relates to channel sounding for one or more wireless communication devices within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 21A, FIG. 21B, FIG. 22A, and FIG. 22B illustrate embodiments of methods for operating wireless communication devices.

DETAILED DESCRIPTION OF THE INVENTION

Figure 1:
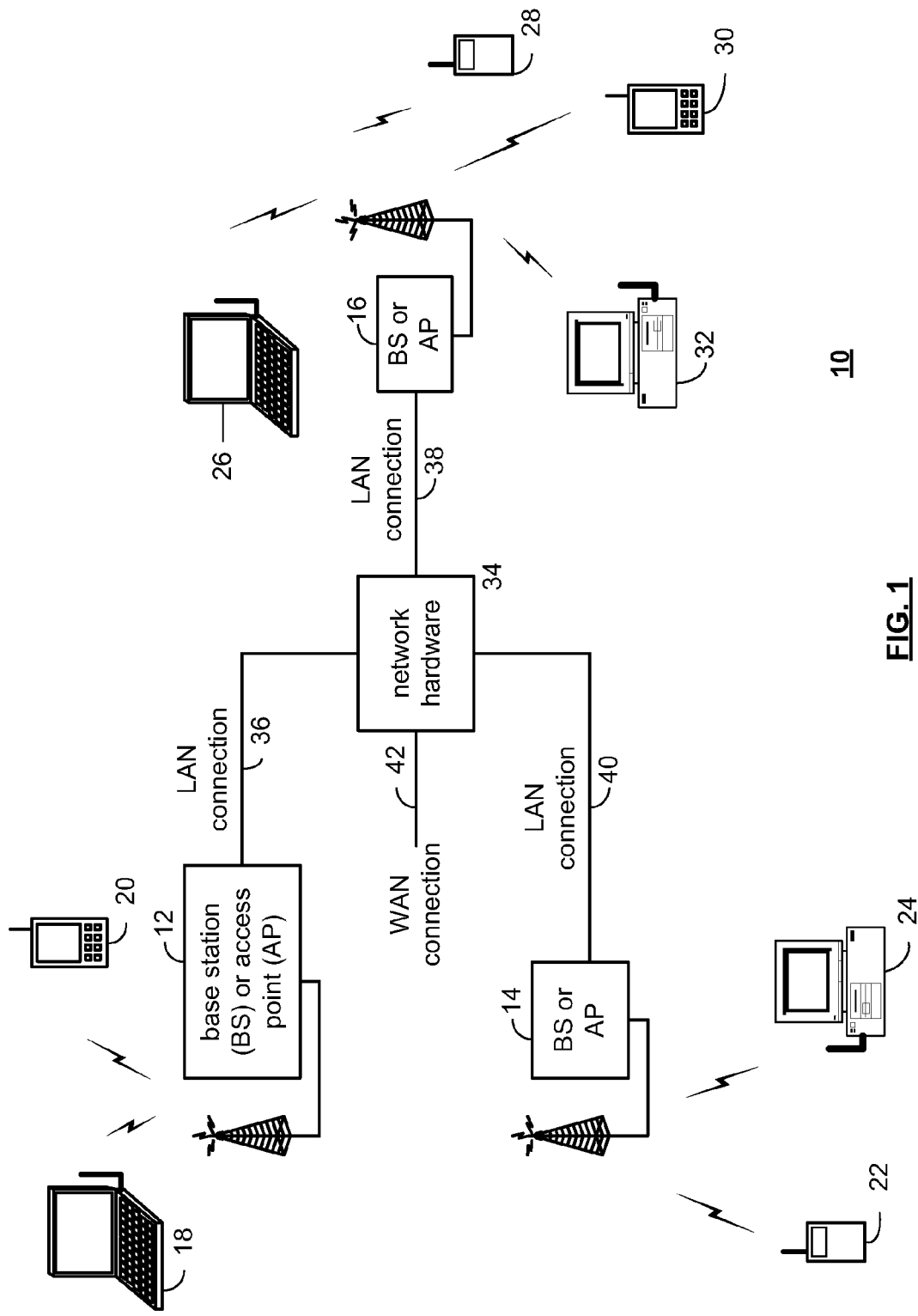
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
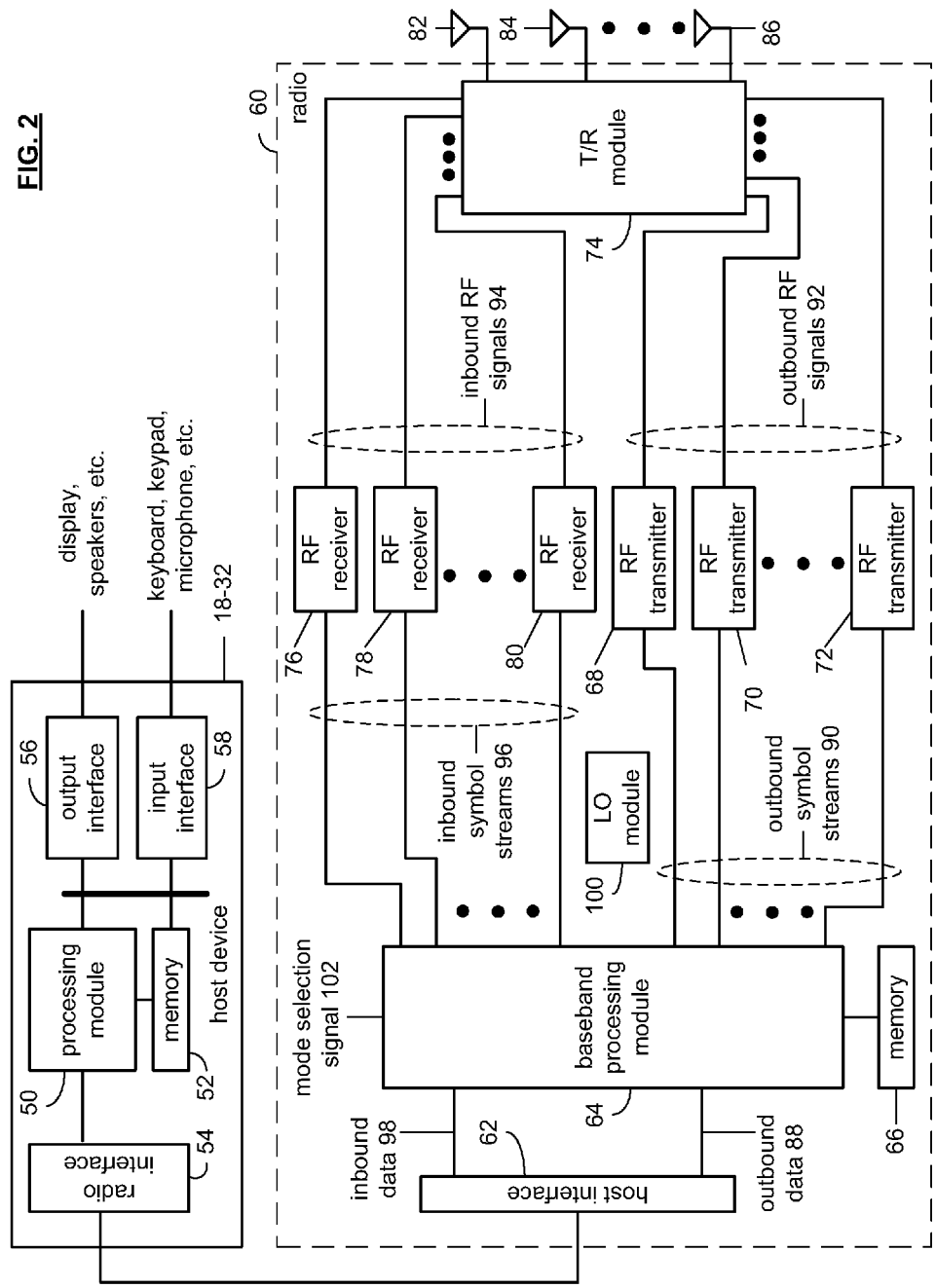
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
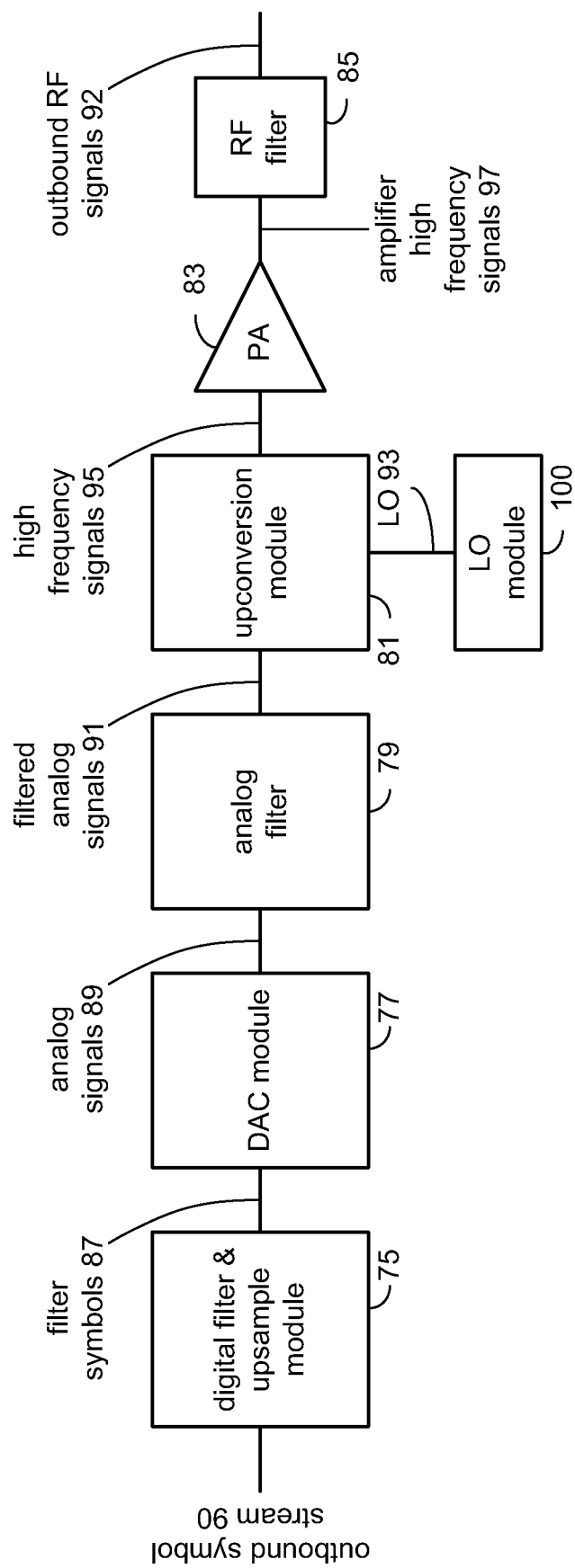
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
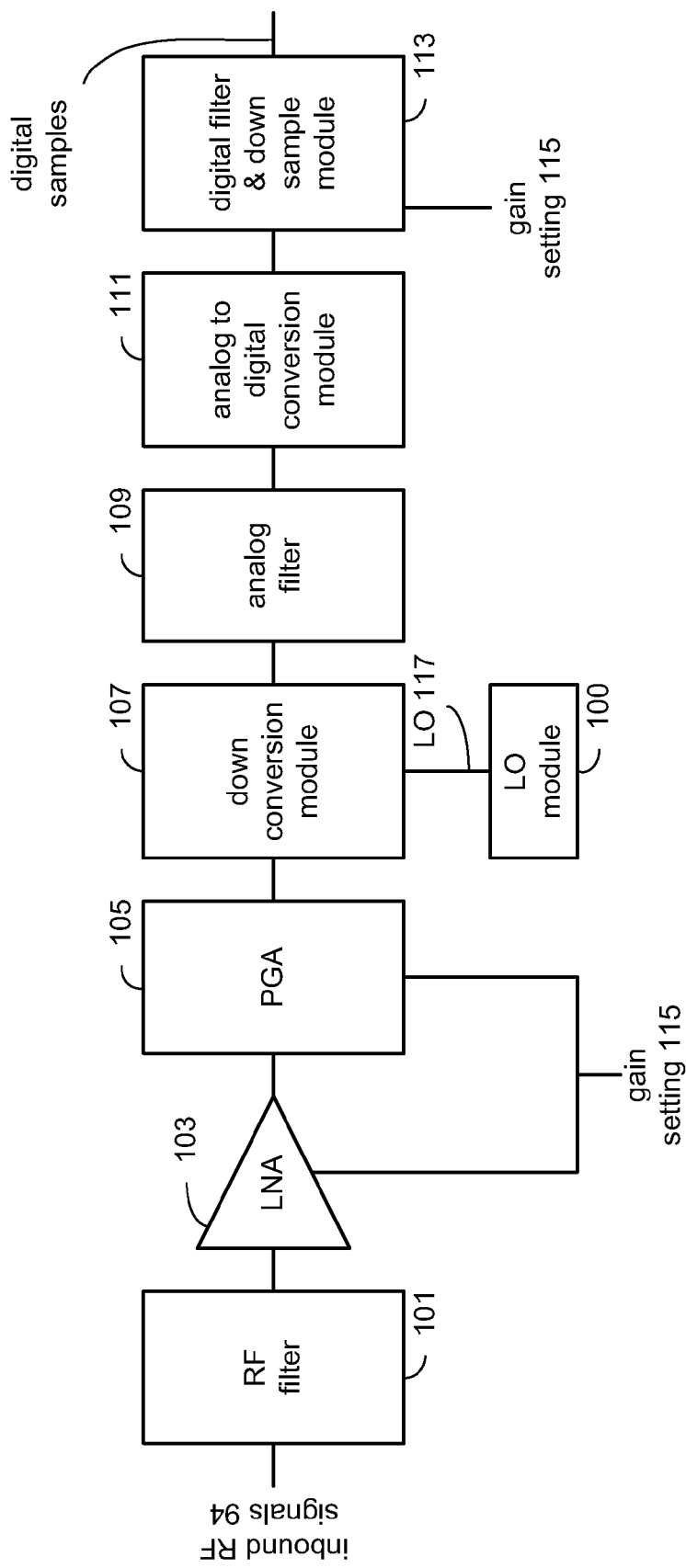
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
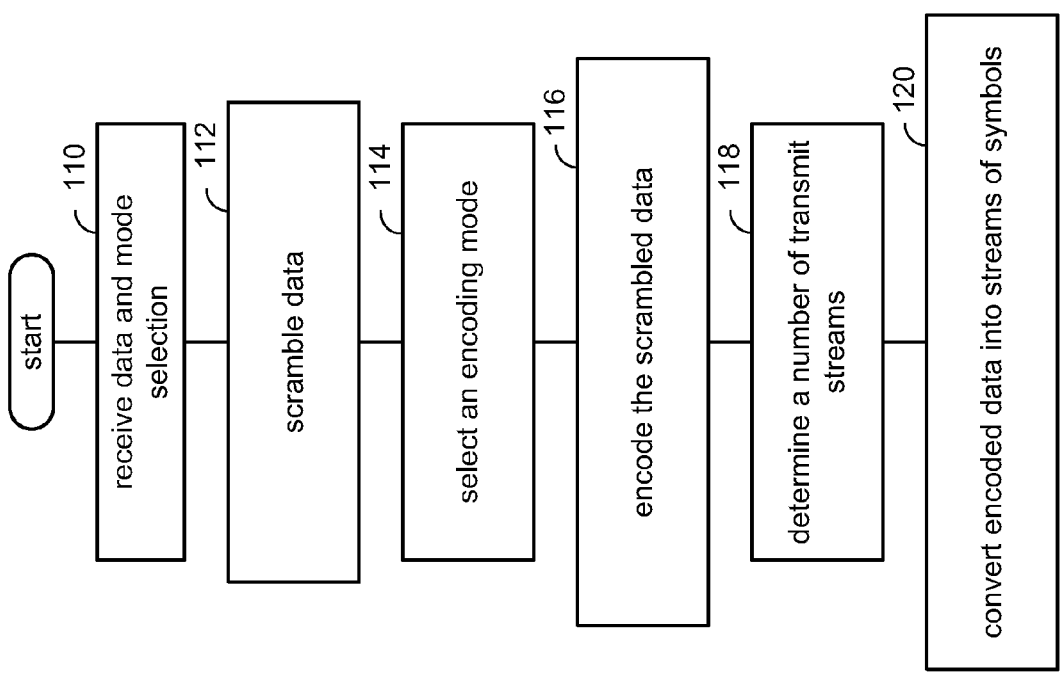
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
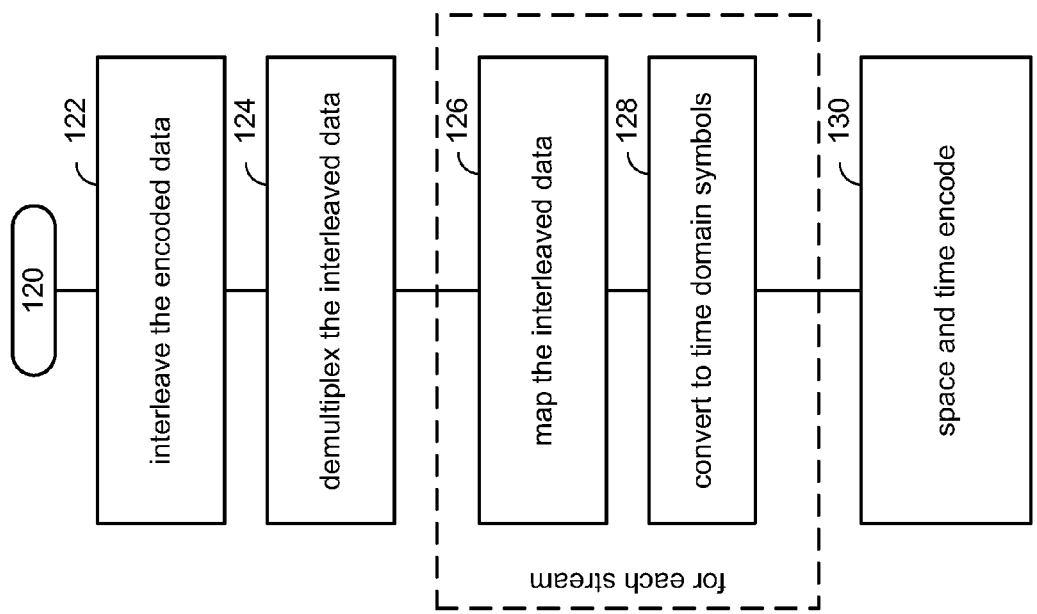
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
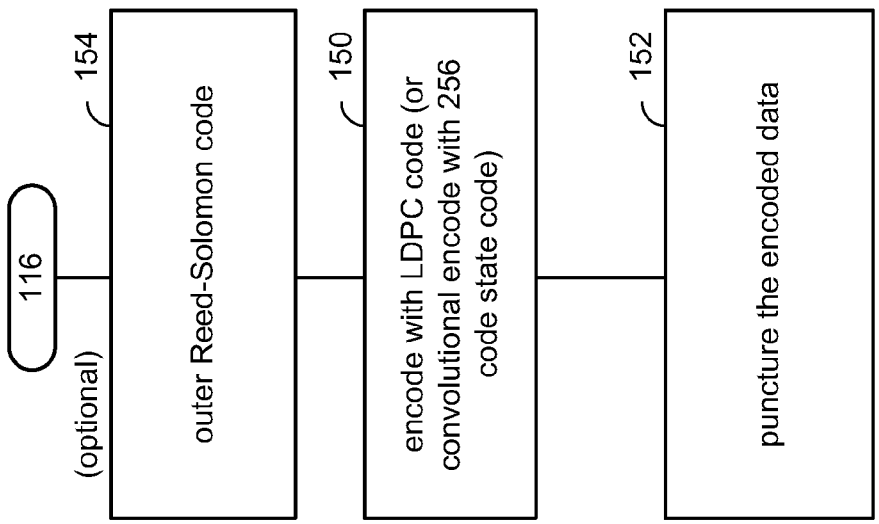
FIGS. 7-9 are diagrams illustrating various embodiments for encoding the scrambled data.
Figure 8:
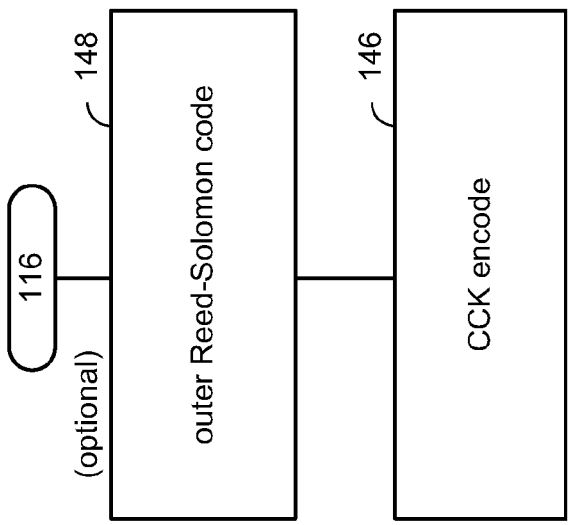
Figure 7:
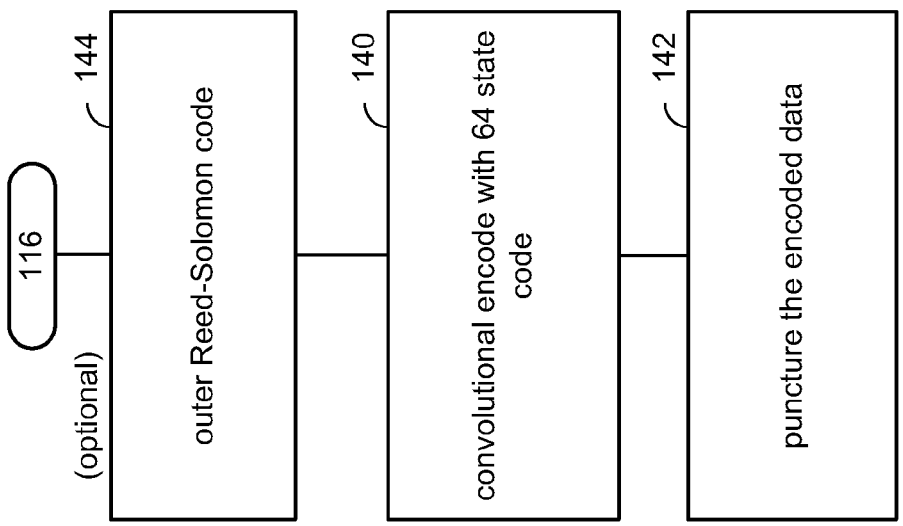

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
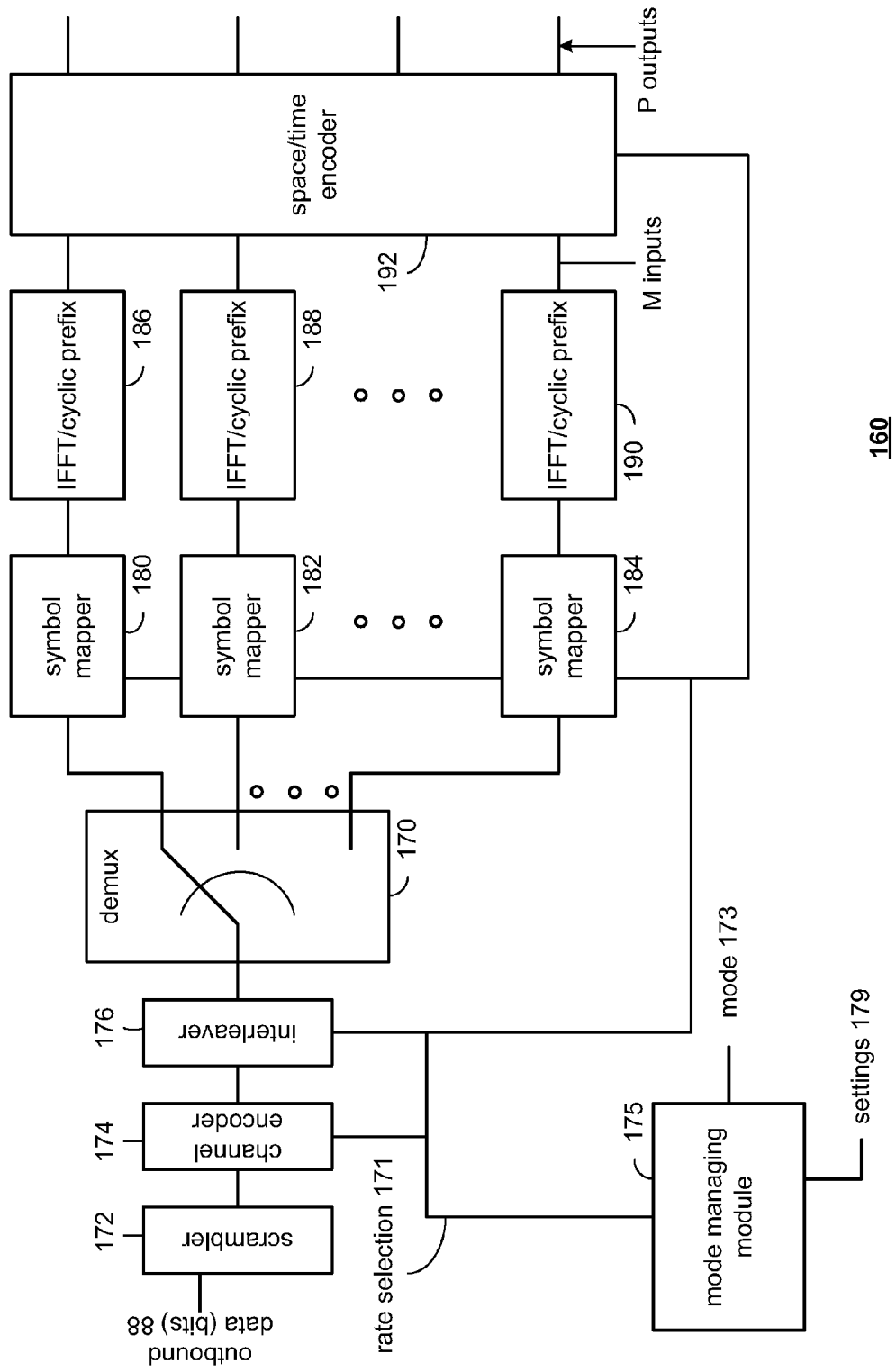
FIGS. 10A and 10B are diagrams illustrating embodiments of a radio transmitter.
Figure 10B:
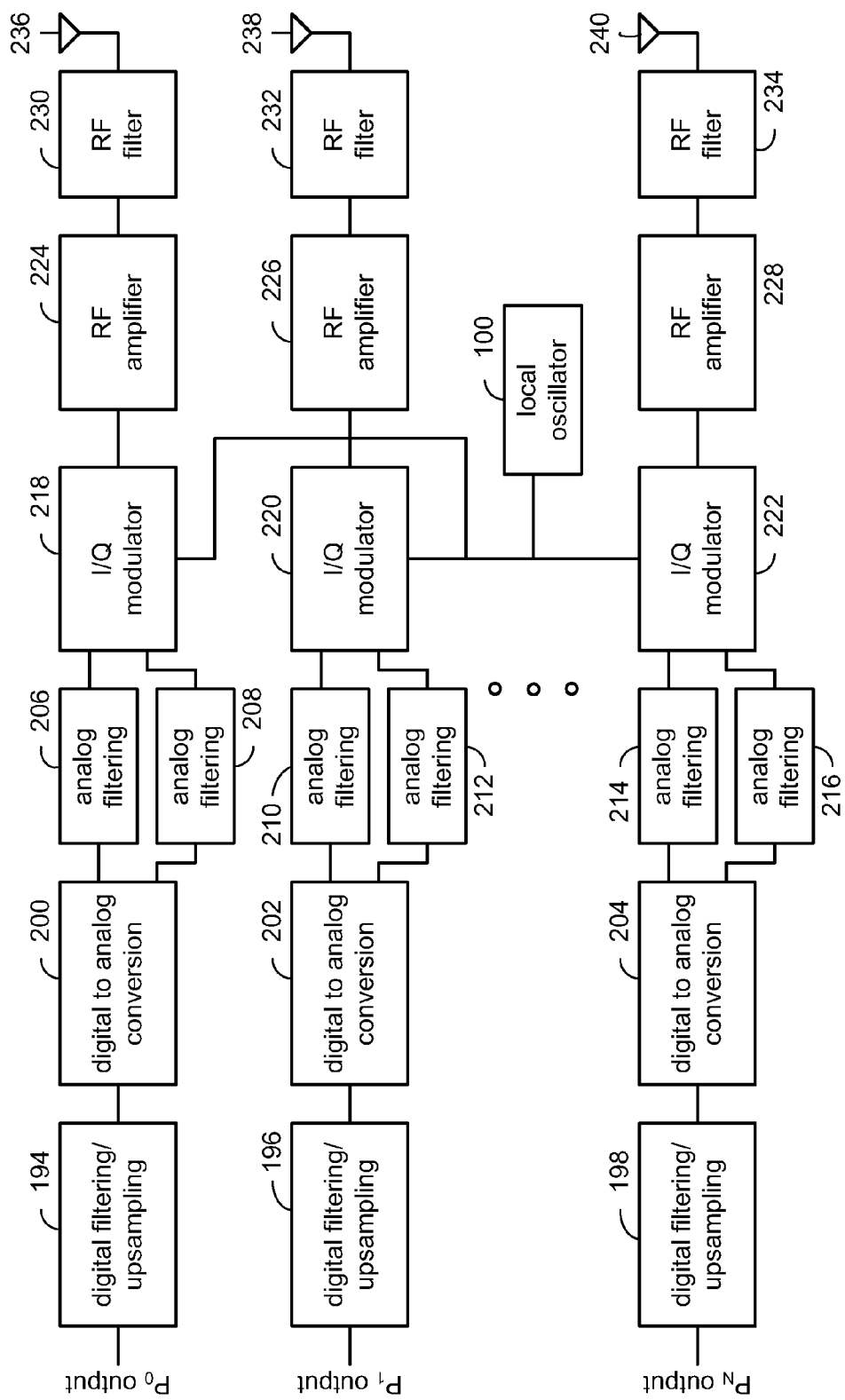

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
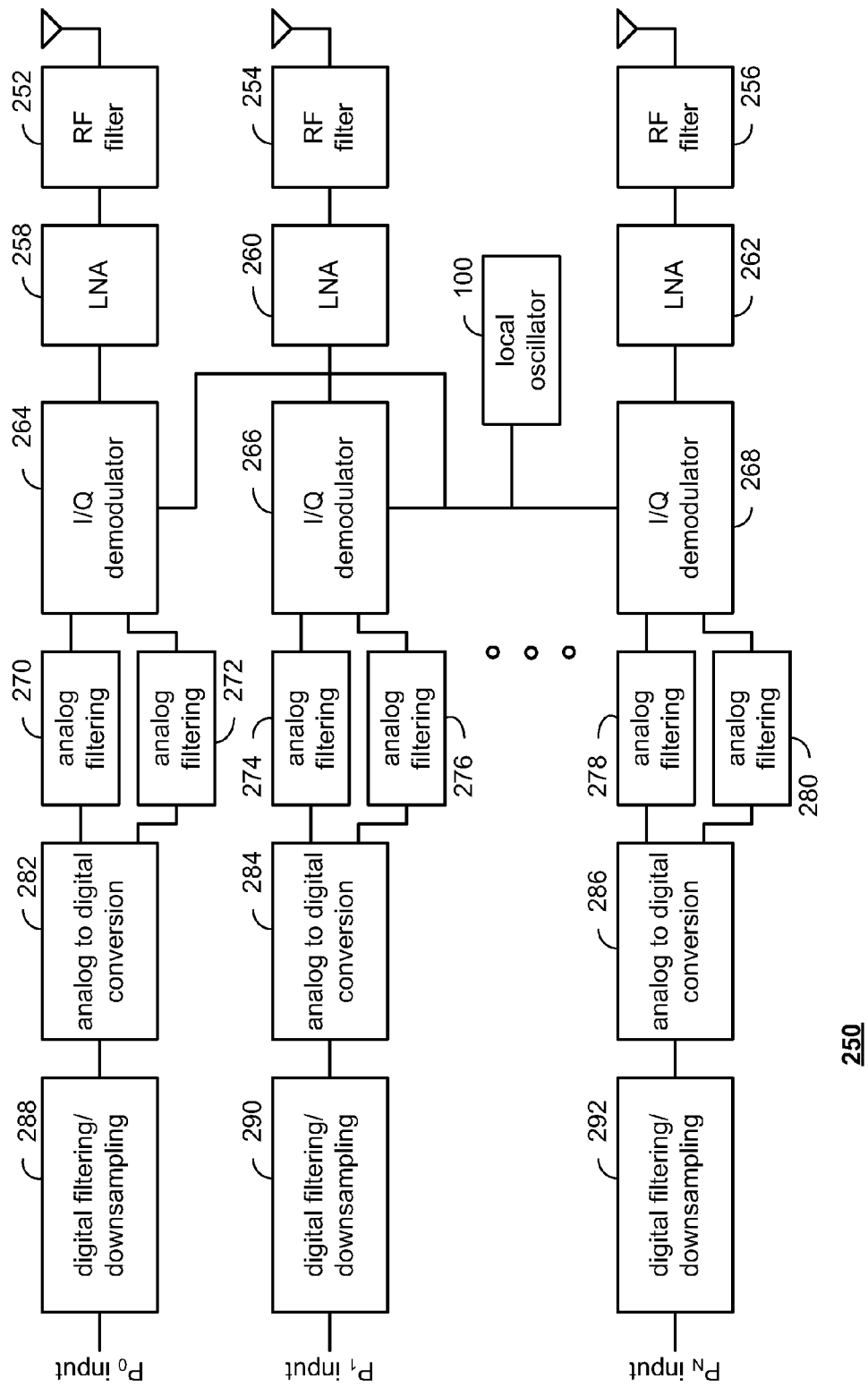
FIGS. 11A and 11B are diagrams illustrating embodiments of a radio receiver.
Figure 11B:
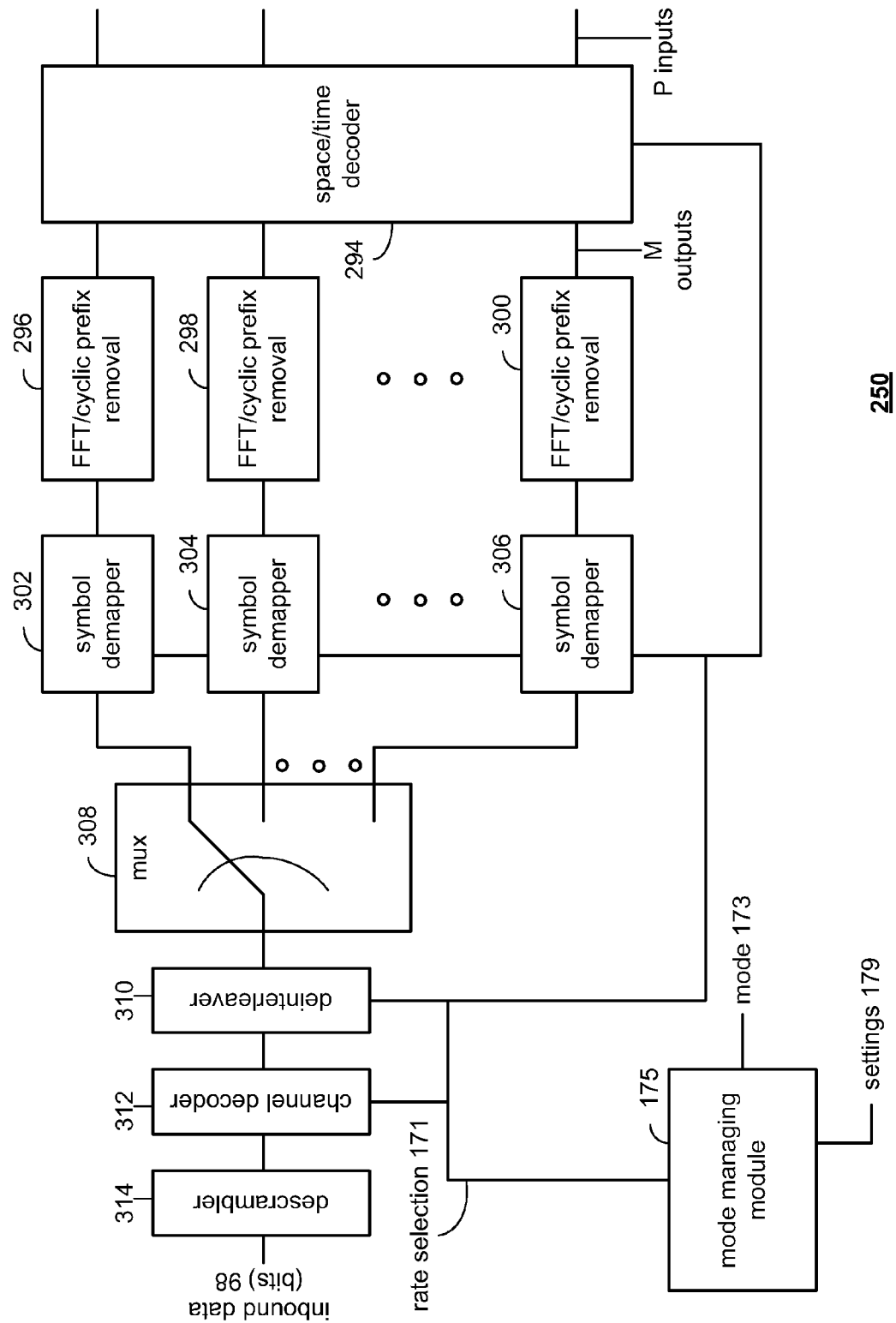

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
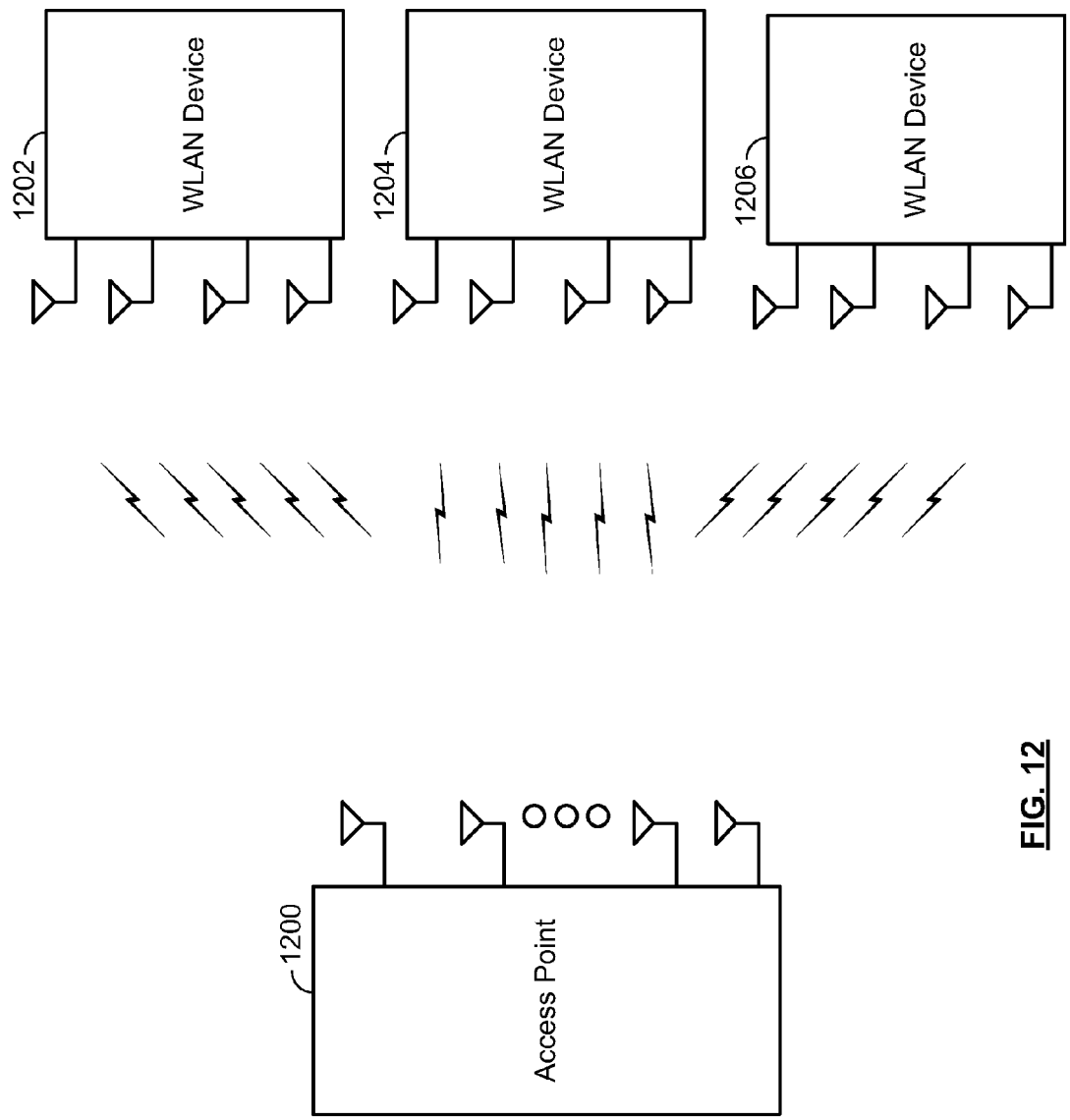
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Figure 13:
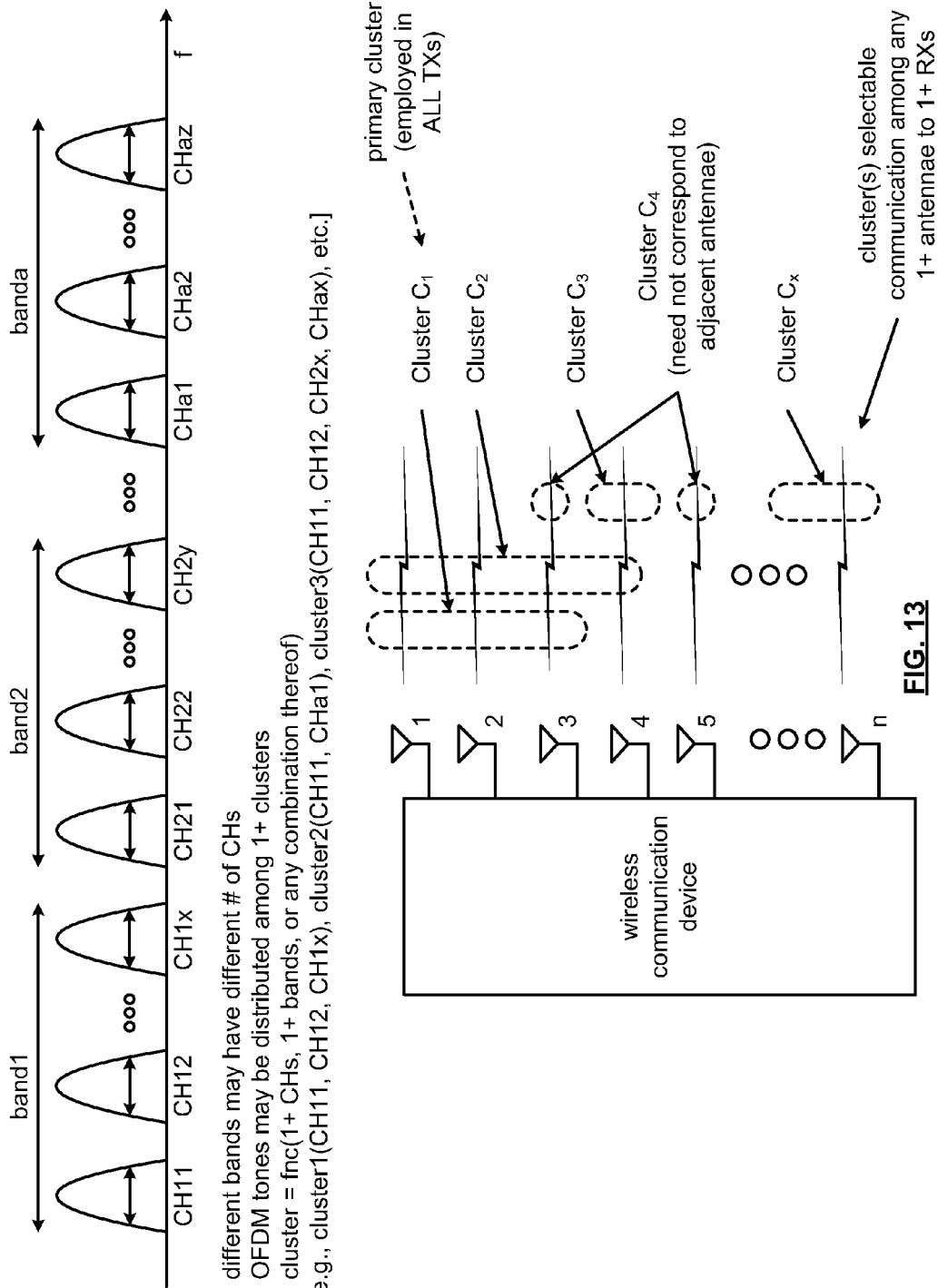
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. For example, the reference numeral convention associated with FIG. 14 (e.g., wireless communication device 1401, etc. generally performing operations which may be associated with transmitting wireless communication devices such as APs, and other wireless communication devices 1402a, 1402b, 1402c, etc. generally performing operations which may be associated with receiving wireless communication devices such as STAs) is employed within various other diagrams for ease of illustration and understanding for the reader in providing a relatively analogous context in which various types of communications may occur. For example, in some embodiments, with respect to FIG. 15 and FIG. 16, wireless communication devices 1501 and 1601, respectively, may generally be referred to as APs, and the other respective wireless communication devices therein may generally be referred to as STAs.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Figure 14:
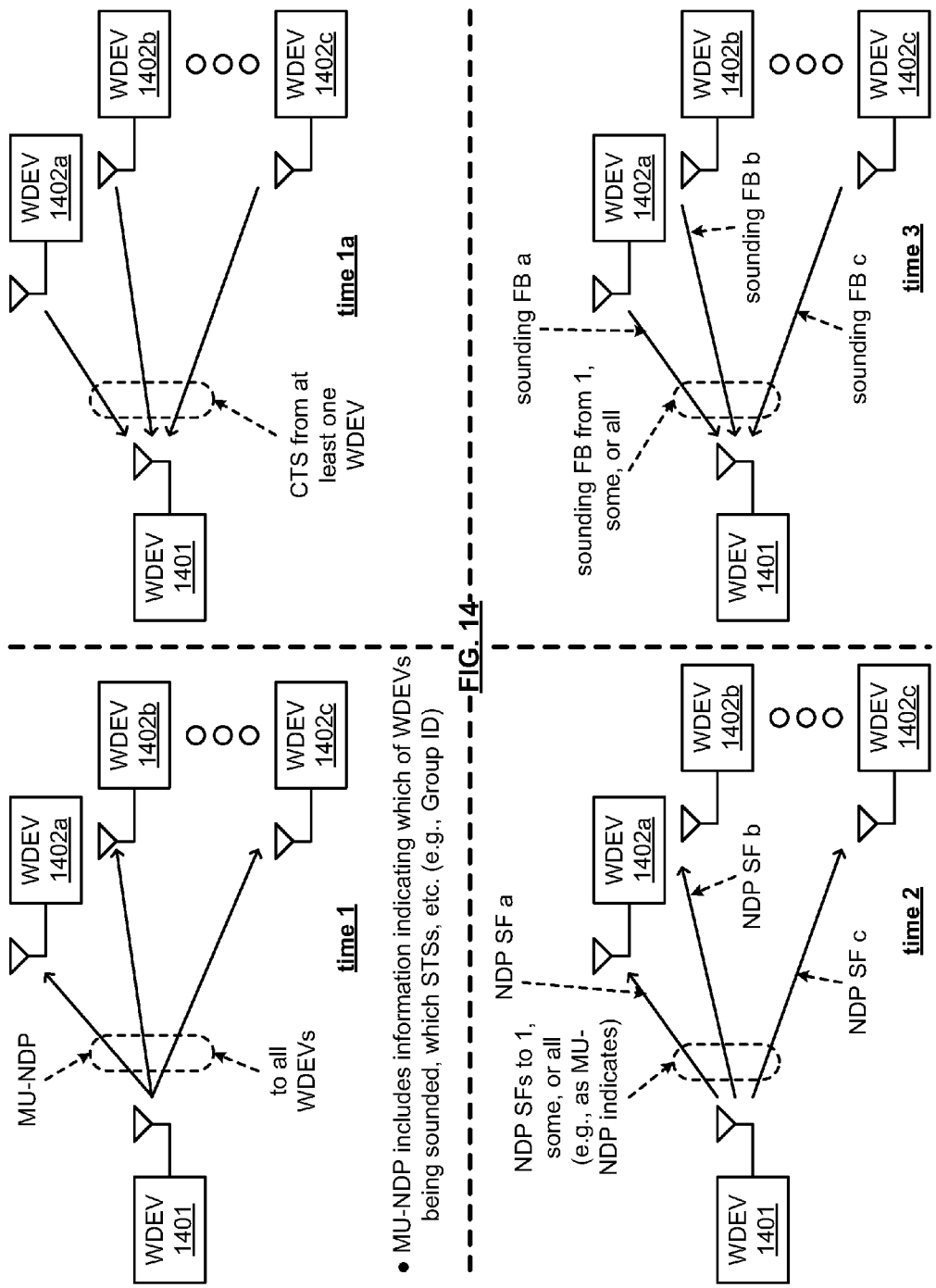
FIG. 14 is a diagram illustrating an embodiment of communications between various wireless communication devices within a communication system.

"FIG. 14 is a diagram illustrating an embodiment of communications between various wireless communication devices within a communication system. In this diagram, a wireless communication device 1401 can include a baseband processing module (e.g., such in accordance with the embodiment of FIG. 2 or otherwise) that is operative to generate a multi-user null data packet (MU-NDP) announcement frame and a plurality of NDP sounding frames. The MU-NDP announcement frame includes information therein that is operative to indicate which of a plurality of wireless communication devices being sounded. Such information may be conveyed in accordance with a group identification field (group ID) therein that, when viewed based on a group definition field, indicates one, some, or all of the wireless communication devices that is to be sounded in accordance with channel characterization, estimation, etc. for generating information as may be employed for use in accordance with beamforming and use in governing and shaping subsequent communications between various of the wireless communication devices within the communication system (e.g., between the wireless communication device 1401 and the wireless communication devices 1402a, 1402b, 1402c, etc.)."

The wireless communication device also includes one or more antennae for use in transmitting the MU-NDP announcement frame to the plurality of wireless communication devices. After transmitting the MU-NDP announcement frame, the wireless communication device also operates by transmitting a plurality of NDP sounding frames to those of the plurality of wireless communication devices being sounded as indicated within the MU-NDP announcement frame. Again, communication links associated with one, some, or all of the wireless communication devices 1402a, 1402b, 1402c, etc. may be sounded in accordance with channel characterization, estimation, etc.

Thereafter, those of the wireless communication devices 1402a, 1402b, 1402c, etc. that are actually sounded (e.g., receive a respective at least one NDP sounding frame) generate and transmit sounding feedback signals back to the wireless communication device 1401. For example, after transmitting the plurality of NDP sounding frames, the wireless communication device 1401 is operative to receive a plurality of sounding feedback signals from the plurality of wireless communication devices being sounded as indicated within the MU-NDP announcement frame or from a subset thereof.

From one perspective, at time 1, the wireless communication device operates by transmitting a multi-user null data packet (MU-NDP) announcement frame to a plurality of wireless communication devices, such that the MU-NDP announcement frame indicating which of the plurality of wireless communication devices being sounded. Then, at time 2, after transmitting the MU-NDP announcement frame, the wireless communication device operates by transmitting a plurality of NDP sounding frames to those of the plurality of wireless communication devices being sounded as indicated within the MU-NDP announcement frame. Then, at time 3, after transmitting the plurality of NDP sounding frames, the wireless communication device operates by receiving a plurality of sounding feedback signals from the plurality of wireless communication devices being sounded as indicated within the MU-NDP announcement frame or from a subset thereof.

In some embodiments (e.g., as shown by time 1*a*), the wireless communication device 1401 may wait for receipt of a clear to send (CTS) response from at least one of the wireless communication devices 1402*a*, 1402*b*, 1402*c*, etc. before sending the plurality of NDP sounding frames to those of the plurality of wireless communication devices being sounded. It is noted that the CTS response need not be one of the wireless communication devices being sounded (e.g., the CTS response may be provided from a non-sounded wireless communication device).

Based on the received sounding feedback signals, the wireless communication device 1401 may perform any number of operations and/or calculations for use in accordance with various operations such as channel estimation, beamforming, etc. such as may be used for subsequent communications within the communication system.

As mentioned above, certain embodiments may include employing a CTS response to the management MU-NDP announcement frame. This may be employed in embodiments in which information related to the collision identification for MU-NDP sequence is desired. For example, a control wrapper request to send (RTS)/clear to send (CTS) exchange may lacks the ability to carry STA assignment information therewith.

By using a CTS response to the management action MU-NDP announcement, several desired benefits may be achieved including providing for collision detection, the MU-NDP announcement frame receiver address (RA) may be provided via broadcast.

A basic services set identification (BSSID) field may be employed to identify an MU-NDP announcement individual responder. The BSSID field is currently only used to validate multi-cast (MCAST) reception. Such information may be useful when receiving wireless communication devices (e.g., STAs) are sending MCAST (IBSS, DLS). For such a use, the frame most likely will be coming from the transmitting wireless communication device (e.g., AP). Alternatively, such roles could be swapped if the group prefers (e.g., BSSID field vs. transmitter address (TA)). For example, the first STA in the first STA assignment may be used as the responder.

Figure 15:
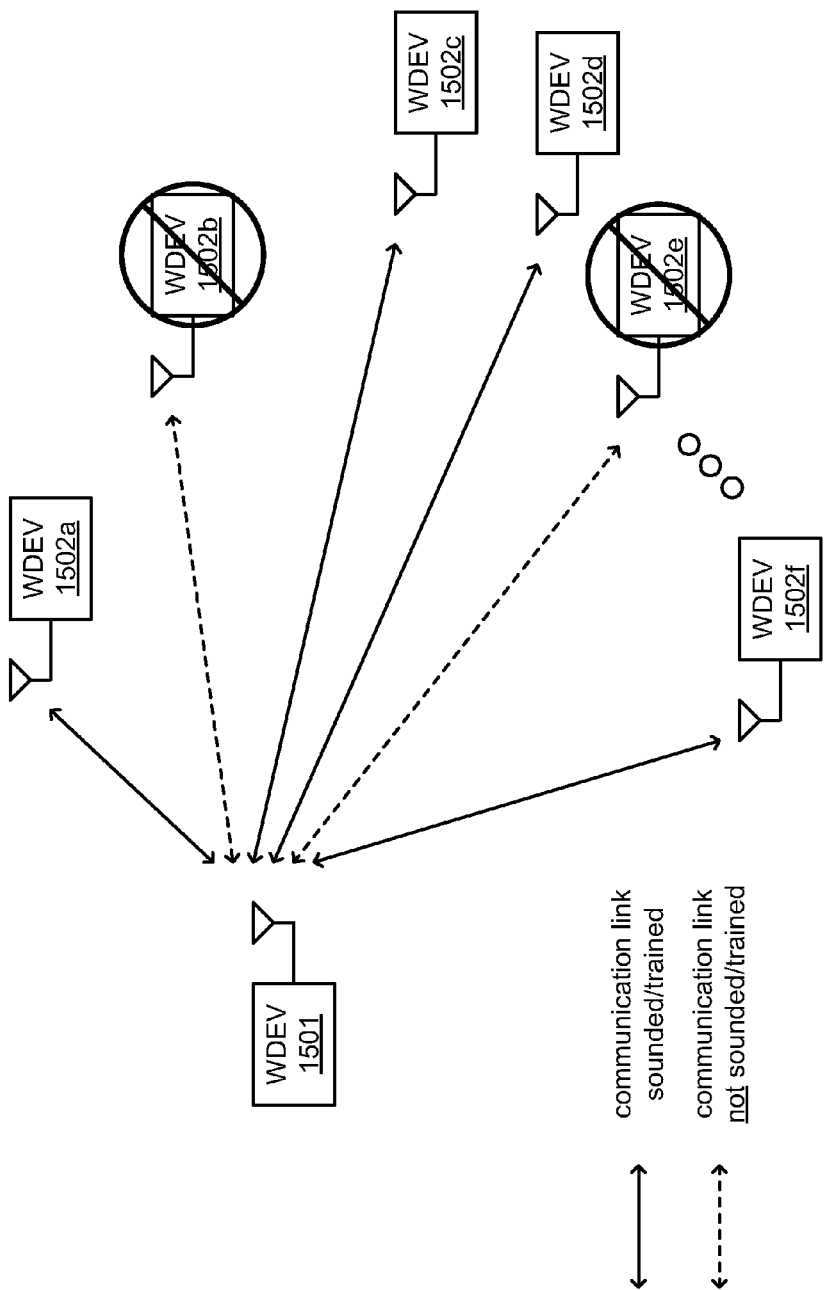
FIG. 15 is a diagram illustrating an embodiment of sounding for one or more communication links between various wireless communication devices within a communication system.

If desired, a responder may send a CTS response in response to the MU-NDP announcement when a CTS response is required, and this may require a non-zero duration (DUR) field value in a BCAST MU-NDP Announcement, "FIG. 15 is a diagram illustrating an embodiment of sounding for one or more communication links between various wireless communication devices within a communication system. As may be seen in this diagram, all of the wireless communication devices 1502*a*, 1502*b*, 1502*c*, 1502*d*, 1502*e*, 1502*f*, etc. need not be sounded based on communications from the wireless communication device 1501. For example, a MU-NDP announcement frame may indicate only those wireless communication devices 1502*a*, 1502*b*, 1502*c*, 1502*d*, 1502*e*, 1502*f*, etc. that are being sounded (e.g., wireless communication devices 1502*a*, 1502*c*, 1502*d*, 1502*f*, etc. in this diagram). The subset of wireless communication devices being sounded may be any subset within the entire group of wireless communication devices 1502*a*, 1502*b*, 1502*c*, 1502*d*, 1502*e*, 1502*f*, etc. including as few as one of the wireless communication devices 1502*a*, 1502*b*, 1502*c*, 1502*d*, 1502*e*, 1502*f*, etc."

Figure 16:
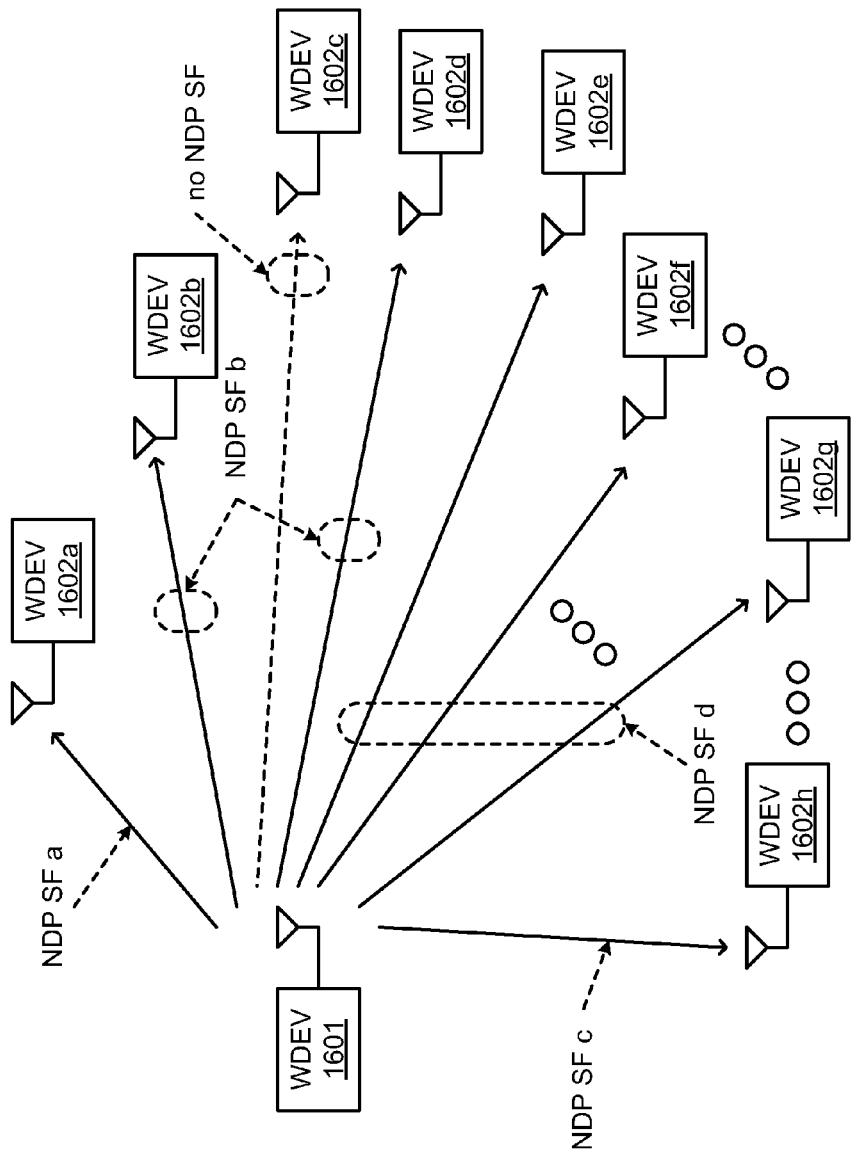
FIG. 16 is a diagram illustrating an embodiment of null data packet (NDP) sounding frame communications between various wireless communication devices within a communication system.

FIG. 16 is a diagram illustrating an embodiment of null data packet (NDP) sounding frame communications between various wireless communication devices within a communication system. As may be seen in this diagram, different of the wireless communication devices 1602*a*, 1602*b*, 1602*c*, 1602*d*, 1602*e*, 1602*f*, etc. may be channel sounded using different respective NDP sounding frames as transmitted from the wireless communication device 1601.

For example, in one embodiment, each of the wireless communication devices may be sounded with a different, respective NDP sounding frame. In some instances, more than one wireless communication device may be sounded using a common NDP sounding frame. As may be seen in this diagram, a first NDP sounding frame (shown as NDP SF a) is employed for use in sounding the communication link between wireless communication device 1601 and wireless communication device 1602*a*. A second NDP sounding frame (shown as NDP SF b) is employed for use in sounding the communication links between wireless communication device 1601 and each of the wireless communication devices 1602*b* and 1602*d*.

Analogously, a third NDP sounding frame (shown as NDP SF c) is employed for use in sounding the communication link between wireless communication device 1601 and wireless communication device 1602*h*. A fourth NDP sounding frame (shown as NDP SF d) is employed for use in sounding the communication links between wireless communication device 1601 and each of the wireless communication devices 1602*e*, 1602*f*, 1602*g*, etc.

As may be seen, any degree of granularity may be employed by which different, respective NDP sounding frames may be employed for sounding the communication links between various wireless communication devices within a communication system. For example, as few as a different respective NDP sounding frame may be employed for each respective communication link. Alternatively, different respective NDP sounding frames may be employed for different, respective groups of communication links. Of course, any combination thereof may also be performed without departing from the scope and spirit of the invention.

FIG. 17, FIG. 18, FIG. 19, and FIG. 20 are diagrams illustrating various embodiments of timing diagrams corresponding to a multi-user (MU) NDP sounding.

Figure 17:
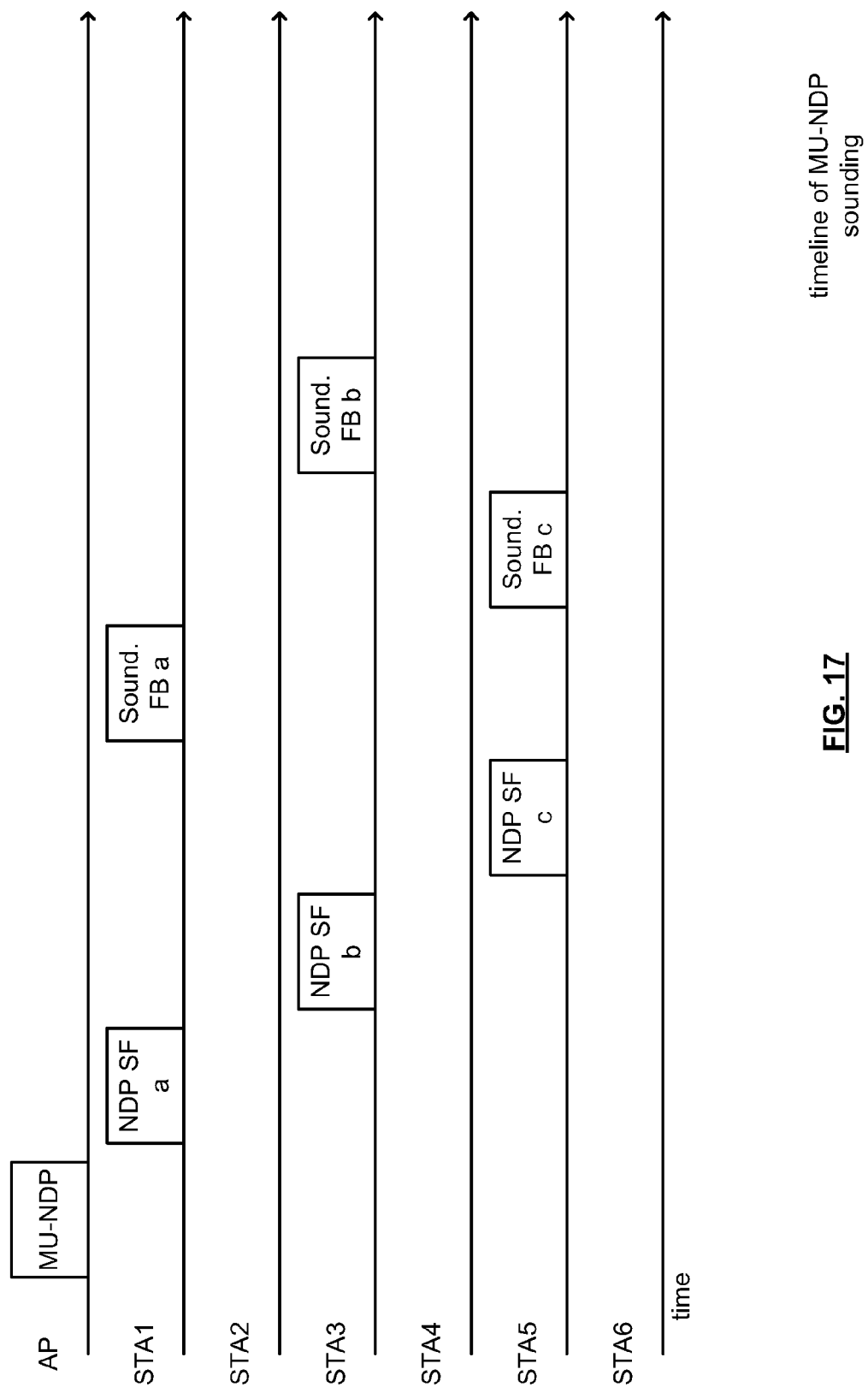
FIG. 17, FIG. 18, FIG. 19, and FIG. 20 are diagrams illustrating various embodiments of timing diagrams corresponding to a multi-user (MU) NDP sounding.

Referring to the embodiment of FIG. 17, initially, from an AP, a MU-NDP announcement frame is transmitted to a plurality of STAs. The MU-NDP announcement frame indicates which of the plurality of wireless communication devices being sounded. After transmitting the MU-NDP announcement frame, the AP operates by transmitting a plurality of NDP sounding frames to those of the plurality of wireless communication devices being sounded as indicated within the MU-NDP announcement frame (e.g., shown as STA1, STA3, and STA5 in this diagram). After transmitting the plurality of NDP sounding frames, the AP operates by receiving a plurality of sounding feedback signals from the plurality of wireless communication devices being sounded as indicated within the MU-NDP announcement frame or from a subset thereof (e.g., from STA1, STA3, and STA5 in this diagram).

The order by which the various wireless communication devices (STA1, STA3, and STA5 in this diagram) provide their respective feedback signals may correspond to the order in which the NDP sounding frames are provided thereto. Alternatively, the order by which the various wireless communication devices (STA1, STA3, and STA5 in this diagram) provide their respective feedback signals may correspond to an order indicated within the MU-NDP announcement frame (e.g., as can be seen in the diagram of the sounding feedback from STA5 being staggered and provided back in a different order than the order in which the NDP sounding frames are provided to the STA1, STA3, and STA5 in this diagram).

Figure 18:
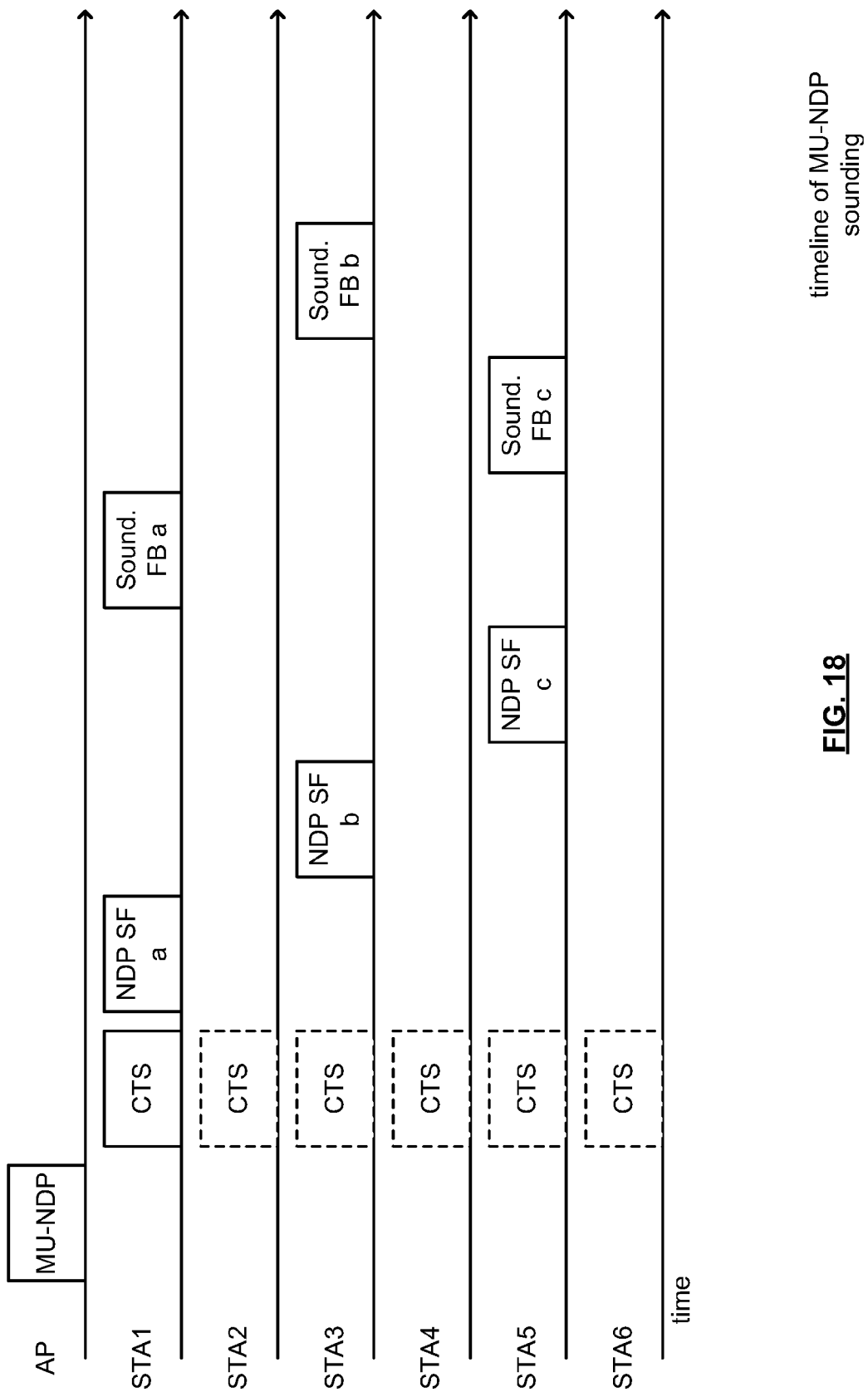

Referring to the embodiment of FIG. 18, this diagram is a variant of the previous embodiment with at least one difference being that, after the MU-NDP announcement frame is transmitted to the plurality of STAs from the AP, a CTS response is provide from at least one of the wireless communication devices (by at least one of the STA1-STA6) before the AP operates by transmitting the plurality of NDP sounding frames to those of the plurality of wireless communication devices being sounded as indicated within the MU-NDP announcement frame (e.g., shown as STA1, STA3, and STA5 in this diagram). As may be seen, the CTS response is the communication that precipitates the transmission of the plurality of NDP sounding frames by the AP.

In certain embodiments, it is noted that when no CTS response is received by the AP, the AP may re-start the operations as described herein including performing a backoff (such as in accordance with IEEE 802.11) and then transmitting at least one additional MU-NDP announcement frame from the AP to a plurality of STAs.

Figure 19:
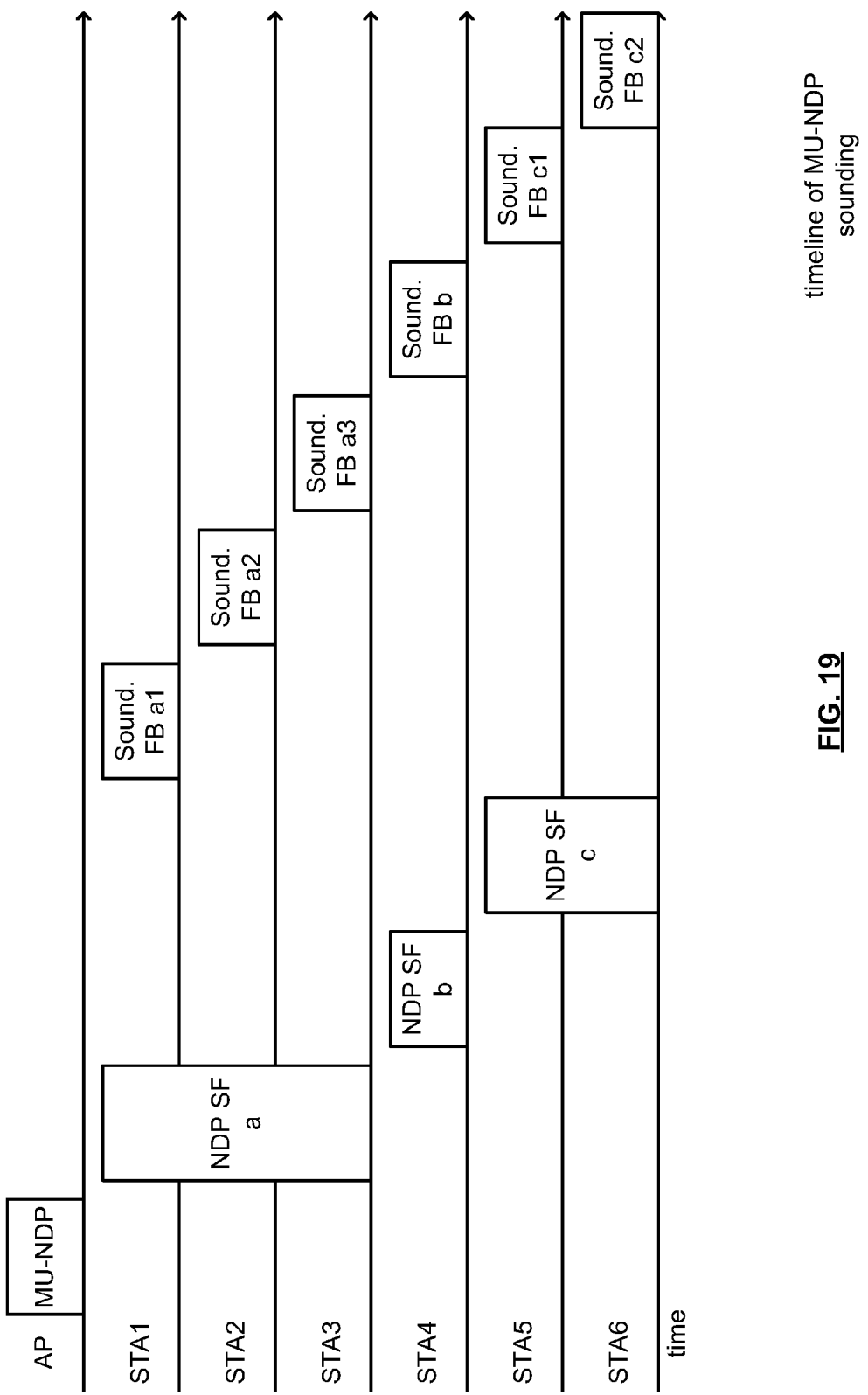

Referring to the embodiment of FIG. 19, this diagram depicts a means by which a common NDP sounding frame may be employed for sounding more than STA. For example, a common NDP sounding frame (shown as NDP SF a) is employed for sounding all of the STA1, STA2, and STA3. Another NDP sounding frame (shown as NDP SF b) is employed for sounding a singular STA4. Also, another common NDP sounding frame (shown as NDP SF c) is employed for sounding both the STA5 and STAG.

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can perform generation of various communications such as multi-user null data packet (MU-NDP) announcement frames, NDP sounding frames, etc. and may also perform processing of received communications such as sounding feedback signals as received by a wireless communication device from other wireless communication devices. Of course, such a baseband processing module, as implemented within a wireless communication device, may perform these and/or any other operations and functions as described herein, etc. or their respective equivalents.

Figure 20:
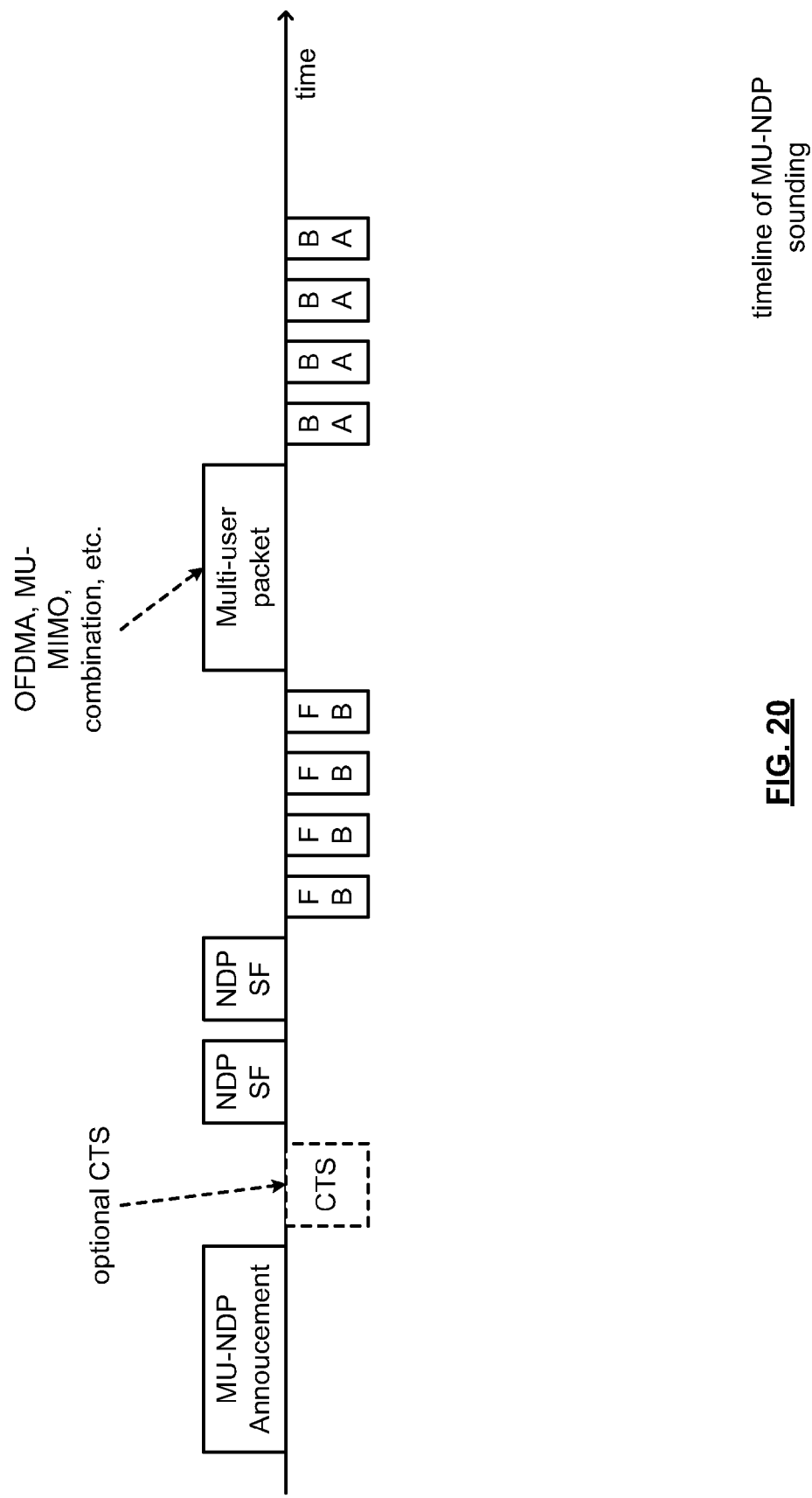

Referring to the embodiment of FIG. 20, this may generally be viewed as being a training exchange and a multi-user packet sequence (e.g., the multi-user packet being transmitted in accordance with any desired type of signaling such as orthogonal frequency division multiple access (OFDMA), multi-user multiple input multiple output (MU-MIMO), combination thereof, etc.). The MU-NDP announcement frame contains an AID list associated with a group ID. As with respect to other embodiments, an optional CTS response may be received from at least one of the wireless communication devices within the wireless communication device before an NDP sounding frame is transmitted to any one of the wireless communication devices. The MU-NDP announcement frame may be a broadcast (BCAST) management action frame transmitted with a group ID/AID list of recipients therein. Again, this may be followed by a CTS response in certain embodiments. Thereafter, various, respective NDP sounding frames follow the announcement frame [exchange] and are transmitted respectively to certain of the wireless communication devices. In response, respective feedback frames are transmitted back to the originating wireless communication devices (e.g., the transmitting wireless communication device) in a sequence based on or according to the order of AID list in sounding frame. If the transmitting wireless communication device (e.g., AP) does not receive a respective feedback frame from certain STA (e.g., STA k in time), then a multi-user packet transmission (e.g., OFDMA, MU-MIMO, etc.) transmission may start with the corresponding N_sts field being zero (i.e., Nsts_k=0) in the VHT-SIG A field thereof. After transmission of the multi-user packet, respective acknowledgements (ACKs) or block acknowledgements (BAs) may be sent, from those receiving wireless communication devices to which the multi-user packet was directed, back to the transmitting wireless communication device.

With respect to the MU-NDP announcement frame format, an NDP sounding frame (Not-sounding bit=0) does necessarily need to include a PHY payload. For example, a preamble typically will include a non-zero group ID (i.e., therefore not being a broadcast communication, but instead being indicated for one or some of the wireless communication devices). For example, only those receiving wireless communication devices (e.g., STAs) with a non-zero N_sts field are supposed to send back channel state information (CSI) information such as in accordance with sounding feedback signaling. Per NDP, the number of VHT-LTFs=sum(Nsts_k).

When multiple NDP sounding frames are sent, each respective NDP sounding frame may have a different group ID. That it to say, as described with respect to various embodiments, each NDP sounding frame may be sent to a group of receiving wireless communication devices (e.g., STAs) having different respective capabilities.

Generally speaking, all sounding feedback signal responses will follow all of the NDP sounding frames. For example, an announcement may indicate a total number of NDP sounding frames to follow thereby allowing response timing determination. In addition, NDP sequence numbers may be added to the PHY header.

With respect to the sounding feedback response provided respectively from certain of the wireless communication devices in response to the NDP sounding frame, a receiving wireless communication device (e.g., STA) can be informed that a MU_STA_ID (such as described with respect to a group ID look up table (LUT)) that is assigned for itself by receiving the announcement frame. A receiving wireless communication device (e.g., STA) can identify itself in the group ID of the NDP sounding frame. It is noted that only those receiving wireless communication devices (e.g., STAs) with non-zero N_sts fields are to be sounded, and the number of VHT-LTFs=sum(Nsts_k). Receiving wireless communication devices (e.g., STAs) that are not assigned in MU_STA_ID can ignore particular NDP sounding frames. For example, receiving wireless communication devices (e.g., STAs) that are requested to provide the sounding feedback signals (e.g., as identified by group ID and having non-zero N_sts field) may then respond in sequence as governed by the group ID.

If a receiving wireless communication device (e.g., STA) misses the MU-NDP announcement frame, there may be a MU_STA_ID synchronization problem which may cause feedback collision. Such MU_STA_ID information that a STA possesses might be out of synch with a transmitting wireless communication device (e.g., AP) if it misses this or any other MU-NDP announcement (e.g., such as during sleep). Safe synchronization may only be possible if there is a positive acknowledgement (ACK) from all new and old wireless communication devices within the group. It may be desirable such that the transmitting wireless communication device (e.g., AP) always includes the group assignment in the MU-NDP announcement frame. The group assignment may not be required preceding any multi-user packets including a group ID therein. For example, for multi-user packets that contain MAC information, such multi-user packets may simply be dropped the packet without providing a response.

An example NDP sounding may be described as follows. There may be cases in which a transmitting wireless communication device (e.g., AP) wants to receive the CSI feedback from selected receiving wireless communication devices (e.g., STAs). This may occur when the transmitting wireless communication device (e.g., AP) believes old CSI from other STAs is still valid, though CSI information corresponding to other wireless communication devices has become stale and may need to be updated.

Some examples (though certainly not unique combinations) are as follows:

1. STA_A,B,D,F are to be sounded→group ID=2, Nsts=[x y 0 0] (1 NDP sounding frame).
2. STA_B,D,E,F,G,H are to be sounded→group ID=8, Nsts=[0 x y z] (1 NDP sounding frame).
3. STA_A,C,F are to be sounded→group ID=4, Nsts=[x 0 0 0] & group ID=15, Nsts=[0 y 0 0] (2 respective NDP sounding frames, one for each group ID).

Form certain perspectives, the Nsts field may be viewed as a further narrowing down of the group of STAs within a given group ID to be sounded. For example, considering the top example:

1. STA_A,B,D,F are to be sounded→group ID=2, Nsts=[x y 0 0] (1 NDP).

The first x space-time streams correspond to the STA_A, and the next y space-time streams correspond to the STA_B. However, since the entries of 0 correspond to STA_D and STA_F, these STAs are not sounded at all, even though they are included within the group ID. The order by which the respective STAs provide their respective sounding feedback signals may be according to the AID list.

Furthermore, as may be seen with respect to the example 3 above, 2 respective NDP sounding frames are employed such that one corresponds to each respective group ID therein (e.g., a first NDP sounding frame for group ID=4, and a second group ID for group ID=15). When multiple subsets of wireless communication devices are included within a give group ID, this may generally be referred to 'overloading' (e.g., example 3 above).

It is noted that multiple NDP sounding frames may follow a MU-NDP announcement frame, with a granularity being as high as a respective and different NDP sounding frame for each respective wireless communication device. Alternatively, at the other spectrum of granularity, a singular, common NDP may be employed for all of the wireless communication devices. An NDP sounding frame can also indicate those particular columns of the channel being sounded. Of course, the degree of bit resolution being employed will also determine how accurate the information included within a sounding feedback signal may be.

Once the transmitting wireless communication device (e.g., AP) gets feedback frames from the STAs, it can schedule groups for a multi-user packet transmission (e.g., OFDMA, MU-MIMO, combination, etc.). For example, the group ID for a MU-MIMO data packet that immediately follows the sounding exchange is not necessarily the same as the group ID that was just assigned during the sounding exchange.

As may be seen herein, at least one possible sounding frame that may be employed for use in accordance with IEEE 802.11ac (ACcord) is a NDP sounding frame. Such a MU-NDP announcement frame may be employed to define MU_STA_ID for the id LUT. Again, a group ID being zero (i.e., GroupID=0 in the preamble) may be used to indicate that it is a broadcasting packet. The NDP sounding indicates which receiving wireless communication devices (e.g., STAs) are to be sounded when using a non-zero GroupID. Again, the STAs to be sounded, and specifically also their corresponding STSs, are identified in N_sts field and the group ID.

FIG. 21A, FIG. 21B, FIG. 22A, and FIG. 22B illustrate embodiments of methods for operating wireless communication devices.

The methods 2100, 2101, and 2200 of the FIG. 21A, FIG. 21B, and FIG. 22A, respectively, may be viewed generally as being performed within transmitting wireless communication devices such as within an access point (AP), or a wireless station (STA) operating functionally similar to or equivalent as an AP, within a communication system including a number of wireless communication devices (e.g., number of STAs and/or APs).

Referring to method 2100 of FIG. 21A, the method 2100 begins by transmitting a multi-user null data packet (MU-NDP) announcement frame to a plurality of wireless communication devices, as shown in a block 2110. In certain embodiments, the MU-NDP announcement frame may indicate which of the plurality of wireless communication devices is being sounded, as shown in a block 2110a.

The method 2100 continues by after transmitting the MU-NDP announcement frame, transmitting a plurality of NDP sounding frames to those of the plurality of wireless communication devices being sounded as indicated within the MU-NDP announcement frame, as shown in a block 2120. The method 2100 then operates by after transmitting the plurality of NDP sounding frames, receiving a plurality of sounding feedback signals from the plurality of wireless communication devices being sounded as indicated within the MU-NDP announcement frame or from a subset thereof, as shown in a block 2130.

Referring to method 2101 of FIG. 21B, the method 2101 begins by transmitting a multi-user null data packet (MU-NDP) announcement frame to a plurality of wireless communication devices, as shown in a block 2111. In certain embodiments, the MU-NDP announcement frame may indicate which of the plurality of wireless communication devices is being sounded, as shown in a block 2111a.

The method 2101 continues by receiving a clear to send (CTS) response from at least one of the plurality of wireless communication devices, as shown in a block 2115. After transmitting the MU-NDP announcement frame, the method 2101 then operates by transmitting a plurality of NDP sounding frames to those of the plurality of wireless communication devices being sounded as indicated within the MU-NDP announcement frame, as shown in a block 2121.

After transmitting the plurality of NDP sounding frames, the method 2101 continues by receiving a plurality of sounding feedback signals from the plurality of wireless communication devices being sounded as indicated within the MU-NDP announcement frame or from a subset thereof, as shown in a block 2131.

Referring to method 2200 of FIG. 22A, the method 2200 begins by transmitting first NDP SF to first wireless communication device, as shown in a block 2210. The method 2200 continues by transmitting second NDP SF to first group of wireless communication devices, as shown in a block 2220.

The method 2200 then operates by transmitting third NDP SF to second wireless communication device, as shown in a block 2230. The method 2200 continues by transmitting fourth NDP SF to second group of wireless communication devices, as shown in a block 2240.

The methods 2201 of the FIG. 22B may be viewed generally as being performed within receiving wireless communication device such as within a STA within a communication system including a number of wireless communication devices (e.g., number of STAs and/or APs).

Referring to method 2201 of FIG. 22B, the method 2201 begins by receiving a MU-NDP announcement frame, as shown in a block 2211. In certain embodiments, the method 2201 may involve transmitting CTS to the transmitting wireless communication device, as shown in a block 2211.

The method 2201 then operates by receiving an NDP sounding frame, as shown in a block 2221. In response to the NDP sounding frame, the method 2201 continues by generating and transmitting a feedback signal, as shown in a block 2231.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| | 2.4 GHz, 20/22 MHz channel BW, 54 Mbps max bit rate | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

| | 5 GHz, 20 MHz channel BW, 54 Mbps max bit rate | | | | | | | | |
|---|---|---|---|---|---|---|---|---|---|
| Rate | Modulation | Code Rate | NBPSC | NCBPS | NDBPS | EVM | Sensitivity | ACR | AACR |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for execution by a wireless communication device, the method comprising:

transmitting a multi-user null data packet (MU-NDP) announcement frame to a plurality of wireless communication devices, wherein the MU-NDP announcement frame indicating which of the plurality of wireless communication devices being sounded, wherein the MU-NDP announcement frame includes a group definition field for use to interpret group identification fields (group IDs);

after transmitting the MU-NDP announcement frame, transmitting a plurality of NDP sounding frames to those of the plurality of wireless communication devices being sounded as indicated within the MU-NDP announcement frame, wherein each NDP sounding frame of the plurality of NDP sounding frames includes a respective group ID that, when interpreted based on the group definition field, indicates which of the plurality of wireless communication devices is sounded by that NDP sounding frame and that is different from group IDs included within each of the other NDP sounding frames of the plurality of NDP sounding frames; and after transmitting the plurality of NDP sounding frames, receiving a plurality of sounding feedback signals from the plurality of wireless communication devices being sounded as indicated within the MU-NDP announcement frame or from a subset thereof.

2. The method of claim 1 further comprising:

receiving a clear to send (CTS) response from at least one of the plurality of wireless communication devices; and after transmitting the MU-NDP announcement frame and after receiving the CTS response, transmitting the plurality of NDP sounding frames to those of the plurality of wireless communication devices being sounded as indicated within the MU-NDP announcement frame.

3. The method of claim 1 further comprising:

receiving a clear to send (CTS) response from at least one additional wireless communication device not included within the plurality of wireless communication devices; and after transmitting the MU-NDP announcement frame and after receiving the CTS response, transmitting the plurality of NDP sounding frames to those of the plurality of wireless communication devices being sounded as indicated within the MU-NDP announcement frame.

4. The method of claim 1 further comprising:

requesting a clear to send (CTS) response from at least one of the plurality of wireless communication devices; and when the CTS response not being received from the at least one of the plurality of wireless communication devices, transmitting at least one additional MU-NDP announcement frame to the plurality of wireless communication devices.

5. The method of claim 1 further comprising:

transmitting a first of the plurality of NDP sounding frames to one of the plurality of wireless communication devices being sounded as indicated within the MU-NDP announcement frame; and transmitting a second of the plurality of NDP sounding frames to a subset of the plurality of wireless communication devices being sounded as indicated within the MU-NDP announcement frame.

6. The method of claim 1 further comprising:

transmitting each of the plurality of NDP sounding frames to a respective one or a respective subset of the plurality of wireless communication devices being sounded as indicated within the MU-NDP announcement frame such that each of the plurality of NDP sounding frames corresponding to a respective one of the plurality of wireless communication devices or a respective subset of the plurality of wireless communication devices.

7. The method of claim 1 further comprising:

after receiving the plurality of sounding feedback signals, transmitting a multi-user packet to the plurality of wireless communication devices or the subset thereof.

8. The method of claim 7, wherein the multi-user packet being a multiple input multiple output (MU-MIMO) packet or an orthogonal frequency division multiple access (OFDMA) packet.

9. The method of claim 7 further comprising:

after transmitting the multi-user packet, receiving a plurality of acknowledgements from the plurality of wireless communication devices or the subset thereof.

10. The method of claim 1 further comprising:

after receiving the plurality of sounding feedback signals, generating a plurality of beamforming vectors; and applying the plurality of beamforming vectors to the multi-user packet before transmitting the multi-user packet to the plurality of wireless communication devices or the subset thereof.

11. The method of claim 1, wherein:

first NDP sounding frame of the plurality of NDP sounding frames includes first group ID that, when interpreted based on the group definition field, indicates first one or more wireless communication devices of the plurality of wireless communication devices sounded by the first NDP sounding frame; and second NDP sounding frame of the plurality of NDP sounding frames includes second group ID that, when interpreted based on the group definition field, indicates second one or more wireless communication devices of the plurality of wireless communication devices sounded by the second NDP sounding frame.

12. The method of claim 11, wherein the second one or more wireless communication devices includes at least one common wireless communication device as the first one or more wireless communication devices.

13. The method of claim 1 further comprising:
receiving the plurality of sounding feedback signals from the plurality of wireless communication devices being sounded as indicated within the MU-NDP announcement frame or from the subset thereof in an order indicated in an association identifier (AID) list within at least one of the plurality of NDP sounding frames.

14. The method of claim 1, wherein:
the wireless communication device includes an access point (AP); and
the plurality of wireless communication devices includes a plurality of wireless stations (STAs).

15. A method for execution by a wireless communication device, the method comprising:
transmitting a multi-user null data packet (MU-NDP) announcement frame to a plurality of wireless communication devices, wherein the MU-NDP announcement frame including a group definition field for use to interpret group identification fields (group IDs);
receiving a clear to send (CTS) response from at least one additional wireless communication device not included within the plurality of wireless communication devices;
after receiving the CTS response, transmitting a plurality of NDP sounding frames to those of the plurality of wireless communication devices being sounded as indicated within the MU-NDP announcement frame, wherein each NDP sounding frame of the plurality of NDP sounding frames includes a respective group ID that, when interpreted based on the group definition field, indicates which of the plurality of wireless communication devices is sounded by that NDP sounding frame and that is different from group IDs included within each of the other NDP sounding frames of the plurality of NDP sounding frames;
after transmitting the plurality of NDP sounding frames, receiving a plurality of sounding feedback signals from the plurality of wireless communication devices being sounded as indicated within the MU-NDP announcement frame or from a subset thereof in an order indicated in an association identifier (AID) list within at least one of the plurality of NDP sounding frames; and
after receiving the plurality of sounding feedback signals, transmitting a multi-user packet to the plurality of wireless communication devices or the subset thereof.

16. The method of claim 15 further comprising:
transmitting a first of the plurality of NDP sounding frames to one of the plurality of wireless communication devices being sounded as indicated within the MU-NDP announcement frame; and
transmitting a second of the plurality of NDP sounding frames to a subset of the plurality of wireless communication devices being sounded as indicated within the MU-NDP announcement frame.

17. The method of claim 15 further comprising:
transmitting each of the plurality of NDP sounding frames to a respective one or a respective subset of the plurality of wireless communication devices being sounded as indicated within the MU-NDP announcement frame such that each of the plurality of NDP sounding frames corresponding to a respective one of the plurality of wireless communication devices or a respective subset of the plurality of wireless communication devices.

18. The method of claim 15, wherein:
the wireless communication device includes an access point (AP); and
the plurality of wireless communication devices includes a plurality of wireless stations (STAs).

19. A wireless communication device comprising:
a processor configured to generate a multi-user null data packet (MU-NDP) announcement frame and a plurality of NDP sounding frames, wherein the MU-NDP announcement frame indicating which of a plurality of wireless communication devices being sounded, wherein the MU-NDP announcement frame includes a group definition field for use to interpret group identification fields (group IDs), wherein each NDP sounding frame of the plurality of NDP sounding frames includes a respective group ID that, when interpreted based on the group definition field, indicates which of the plurality of wireless communication devices is sounded by that NDP sounding frame and that is different from group IDs included within each of the other NDP sounding frames of the plurality of NDP sounding frames; and
a communication interface configured to:
transmit the MU-NDP announcement frame to the plurality of wireless communication devices;
after transmitting the MU-NDP announcement frame, transmit a plurality of NDP sounding frames to those of the plurality of wireless communication devices being sounded as indicated within the MU-NDP announcement frame; and
after transmitting the plurality of NDP sounding frames, receive a plurality of sounding feedback signals from the plurality of wireless communication devices being sounded as indicated within the MU-NDP announcement frame or from a subset thereof.

20. The wireless communication device of claim 19 further comprising:
the communication interface configured to receive a clear to send (CTS) response from at least one of the plurality of wireless communication devices; and
after transmitting the MU-NDP announcement frame and after receiving the CTS response, the communication interface configured to transmit the plurality of NDP sounding frames to those of the plurality of wireless communication devices being sounded as indicated within the MU-NDP announcement frame.

21. The wireless communication device of claim 19 further comprising:
the communication interface configured to receive a clear to send (CTS) response from at least one additional wireless communication device not included within the plurality of wireless communication devices; and
after transmitting the MU-NDP announcement frame and after receiving the CTS response, the communication interface configured to transmit the plurality of NDP sounding frames to those of the plurality of wireless communication devices being sounded as indicated within the MU-NDP announcement frame.

22. The wireless communication device of claim 19 further comprising:
the wireless communication device configured to request a clear to send (CTS) response from at least one of the plurality of wireless communication devices; and
when the CTS response not being received from the at least one of the plurality of wireless communication devices, the communication interface configured to transmit at least one additional MU-NDP announcement frame to the plurality of wireless communication devices.

23. The wireless communication device of claim 19, wherein the communication interface is further configured to:
transmit each of the plurality of NDP sounding frames to a respective one or a respective subset of the plurality of wireless communication devices being sounded as indicated within the MU-NDP announcement frame such that each of the plurality of NDP sounding frames corresponding to a respective one of the plurality of wireless communication devices or a respective subset of the plurality of wireless communication devices.

24. The wireless communication device of claim 19 further comprising:
after receiving the plurality of sounding feedback signals, the communication interface configured to transmit a multi-user packet to the plurality of wireless communication devices or the subset thereof.

25. The wireless communication device of claim 24, wherein the multi-user packet being a multiple input multiple output (MU-MIMO) packet or an orthogonal frequency division multiple access (OFDMA) packet.

26. The wireless communication device of claim 24 further comprising:
after transmitting the multi-user packet, the communication interface configured to receive a plurality of acknowledgements from the plurality of wireless communication devices or the subset thereof.

27. The wireless communication device of claim 19 further comprising:
after the wireless communication device receiving the plurality of sounding feedback signals, the processor configured to generate a plurality of beamforming vectors; and
the processor configured to apply the plurality of beamforming vectors to the multi-user packet before the wireless communication device transmitting the multi-user packet to the plurality of wireless communication devices or the subset thereof.

28. The wireless communication device of claim 19, wherein:
first NDP sounding frame of the plurality of NDP sounding frames includes first group ID that, when interpreted based on the group definition field, indicates first one or more wireless communication devices of the plurality of wireless communication devices sounded by the first NDP sounding frame; and
second NDP sounding frame of the plurality of NDP sounding frames includes second group ID that, when interpreted based on the group definition field, indicates second one or more wireless communication devices of the plurality of wireless communication devices sounded by the second NDP sounding frame.

29. The wireless communication device of claim 28, wherein the second one or more wireless communication devices includes at least one common wireless communication device as the first one or more wireless communication devices.

30. The wireless communication device of claim 19, wherein the communication interface is further configured to:
receive the plurality of sounding feedback signals from the plurality of wireless communication devices being sounded as indicated within the MU-NDP announcement frame or from the subset thereof in an order indicated in an association identifier (AID) list within at least one of the plurality of NDP sounding frames.

31. The wireless communication device of claim 19 further comprising:
an access point (AP), wherein the plurality of wireless communication devices includes a plurality of wireless stations (STAs).

\* \* \* \* \*